(12) United States Patent
Murata et al.

(10) Patent No.: US 10,365,428 B2
(45) Date of Patent: Jul. 30, 2019

(54) LIGHT EMITTING DEVICE, IMAGE READING DEVICE, AND IMAGE FORMING APPARATUS

(71) Applicant: FUJI XEROX CO., LTD., Tokyo (JP)

(72) Inventors: Yoshihiro Murata, Mie (JP); Kazuo Matsumae, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/059,056

(22) Filed: Aug. 9, 2018

(65) Prior Publication Data

US 2019/0187364 A1    Jun. 20, 2019

(30) Foreign Application Priority Data

Dec. 20, 2017    (JP) .................. 2017-244485

(51) Int. Cl.
*F21V 8/00* (2006.01)
*G03G 15/04* (2006.01)
*G03G 15/00* (2006.01)

(52) U.S. Cl.
CPC .......... *G02B 6/0095* (2013.01); *G02B 6/0083* (2013.01); *G03G 15/04036* (2013.01); *G03G 15/602* (2013.01)

(58) Field of Classification Search
CPC ... G02B 6/0095; G02B 6/0083; G03G 15/602
See application file for complete search history.

(56) References Cited

FOREIGN PATENT DOCUMENTS

JP    2007-251353    9/2007

*Primary Examiner* — Joseph L Williams
(74) *Attorney, Agent, or Firm* — JCIPRNET

(57) ABSTRACT

A light emitting device includes at least one light-guide member that extends in one direction and that is fixed to a housing in such a manner as to be capable of expanding and contracting in the one direction, at least one light emitting element that is disposed in such a manner as to face an end surface of the light-guide member and that radiates light onto the end surface of the light-guide member, a rigid board that is disposed such that the light emitting element is interposed between the rigid board and the light-guide member and on which the light emitting element is mounted, the rigid board being movable in the one direction with respect to the housing, and a pressing member that presses the light emitting element against the end surface of the light-guide member via the rigid board.

8 Claims, 21 Drawing Sheets

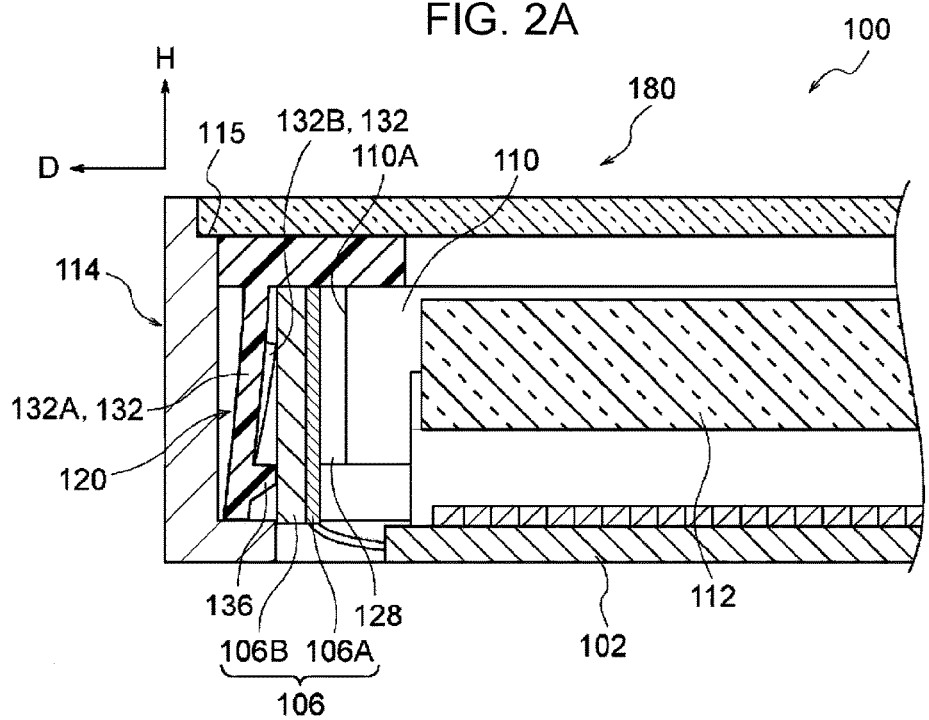
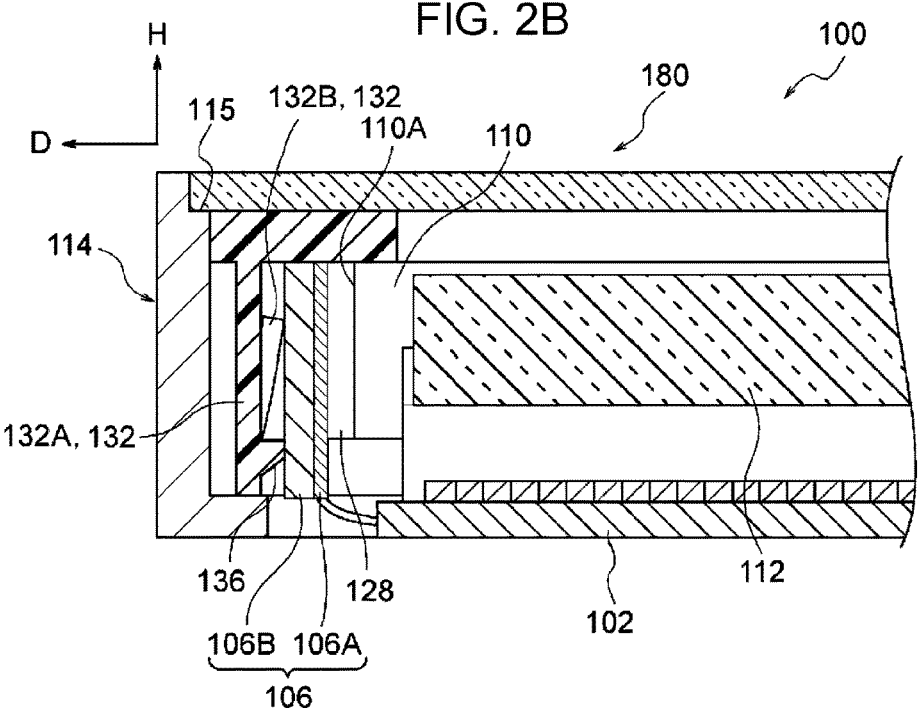

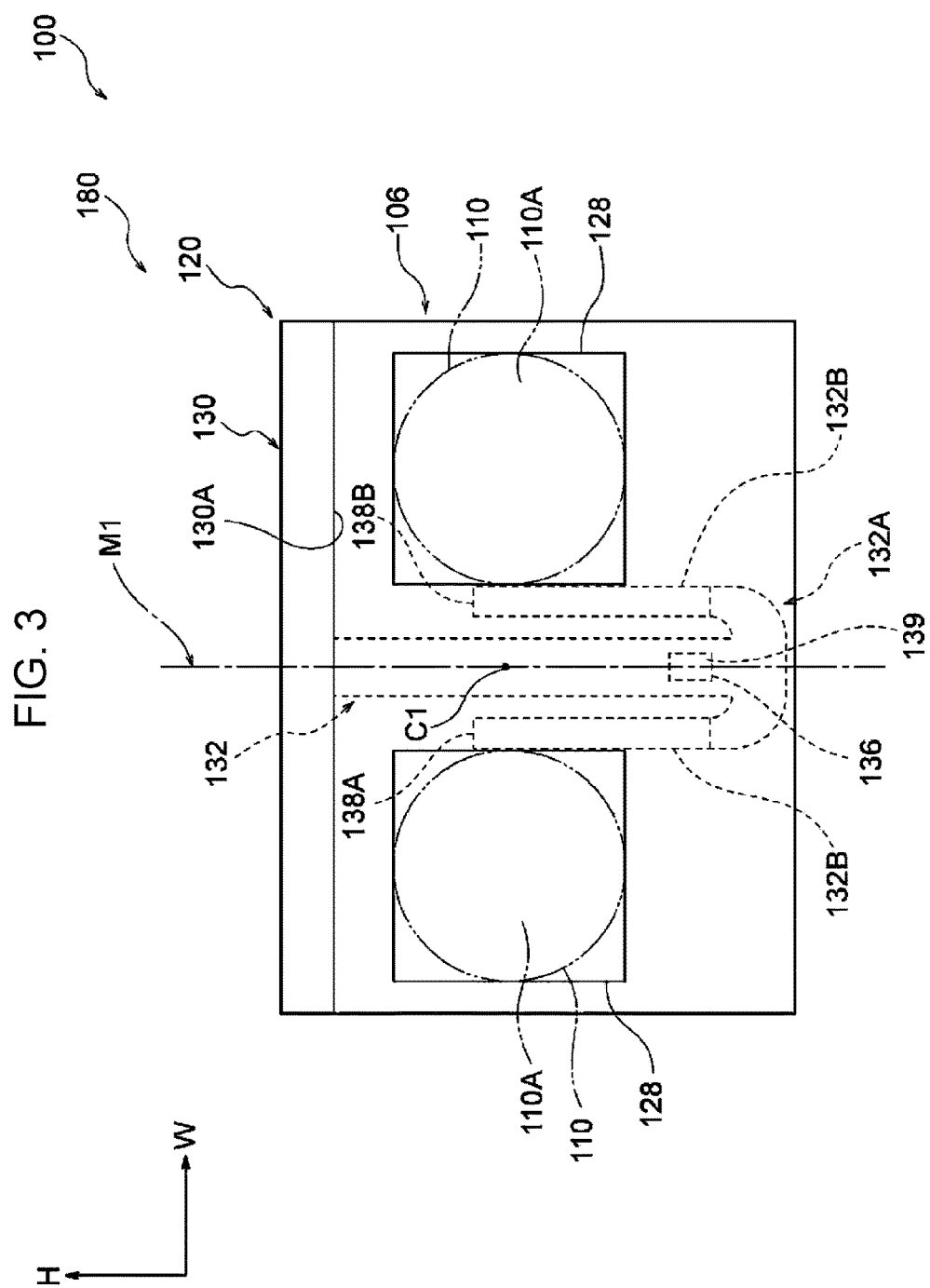

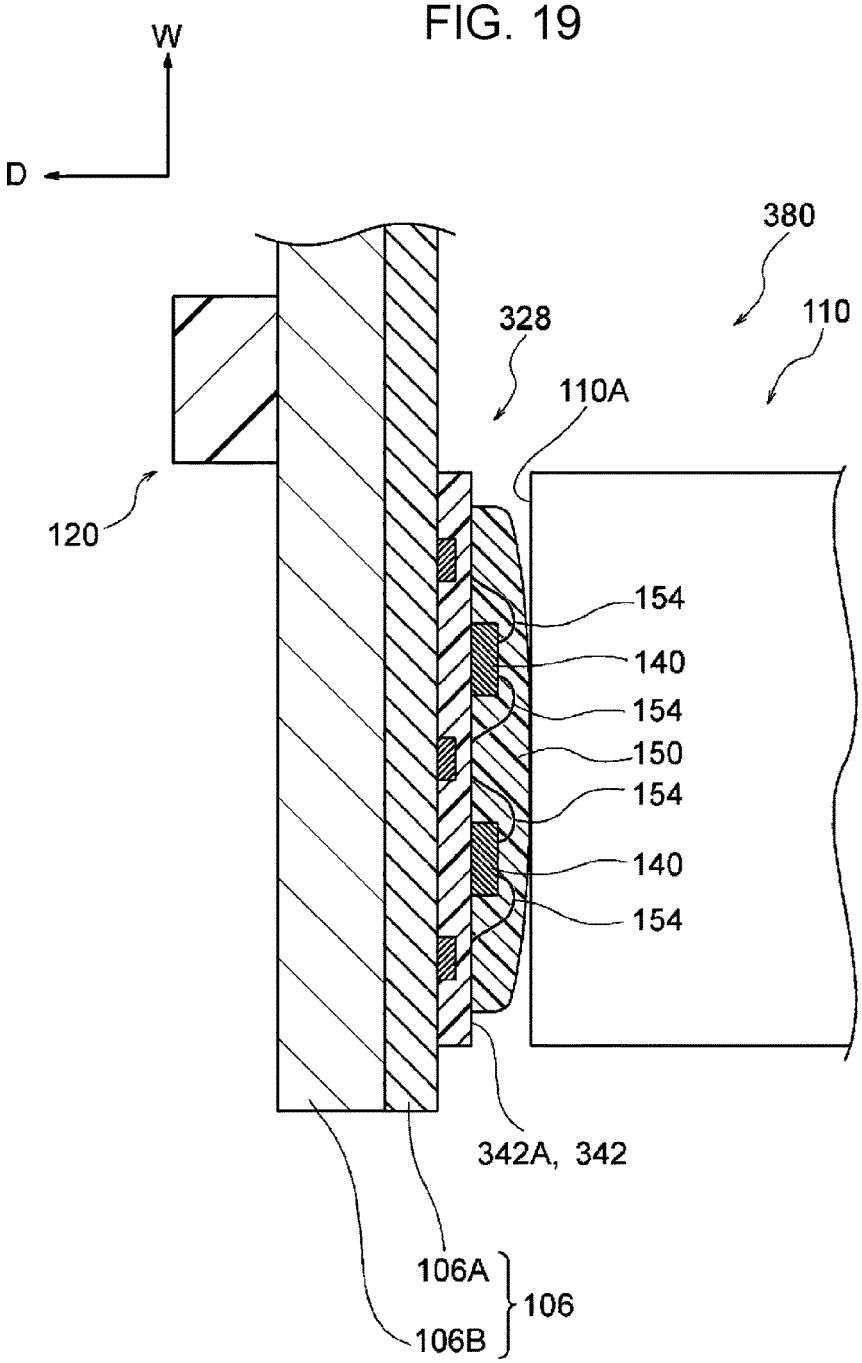

LIGHT EMITTING DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2017-244485 filed Dec. 20, 2017.

BACKGROUND

(i) Technical Field

The present invention relates to a light emitting device, an image reading device, and an image forming apparatus.

(ii) Related Art

A light emitting device includes a light-guide member that has a columnar shape extending in one direction, a light-emitting element that is in contact with an end surface of the light-guide member and that radiates light toward the end surface of the light-guide member, a rigid board on which the light-emitting element is mounted, and a housing in which these components are accommodated. Here, there is a case where the length of the light-guide member in one direction changes due to, for example, temperature changes, and as a result, the rigid board, on which the light-emitting element is mounted, is inclined with respect to the end surface of the light-guide member. That is to say, there is a case where (the optical axis of) the light-emitting element is inclined with respect to (the axis of) the light-guide member.

SUMMARY

According to an aspect of the invention, there is provided a light emitting device including at least one light-guide member that extends in one direction and that is fixed to a housing in such a manner as to be capable of expanding and contracting in the one direction, at least one light emitting element that is disposed in such a manner as to face an end surface of the light-guide member and that radiates light onto the end surface of the light-guide member, a rigid board that is disposed such that the light emitting element is interposed between the rigid board and the light-guide member and on which the light emitting element is mounted, the rigid board being movable in the one direction with respect to the housing, and a pressing member that presses the light emitting element against the end surface of the light-guide member via the rigid board.

BRIEF DESCRIPTION OF THE DRAWINGS

Exemplary embodiments of the present invention will be described in detail based on the following figures, wherein:

FIGS. 2A and 2B are sectional views illustrating the image reading device and the light emitting device according to the first exemplary embodiment of the present invention;

FIG. 3 is a front view illustrating the image reading device and the light emitting device according to the first exemplary embodiment of the present invention;

FIG. 19 is a sectional view illustrating a light emitting device according to a second comparative example for the first exemplary embodiment of the present invention;

DETAILED DESCRIPTION

First Exemplary Embodiment

Figure 1:
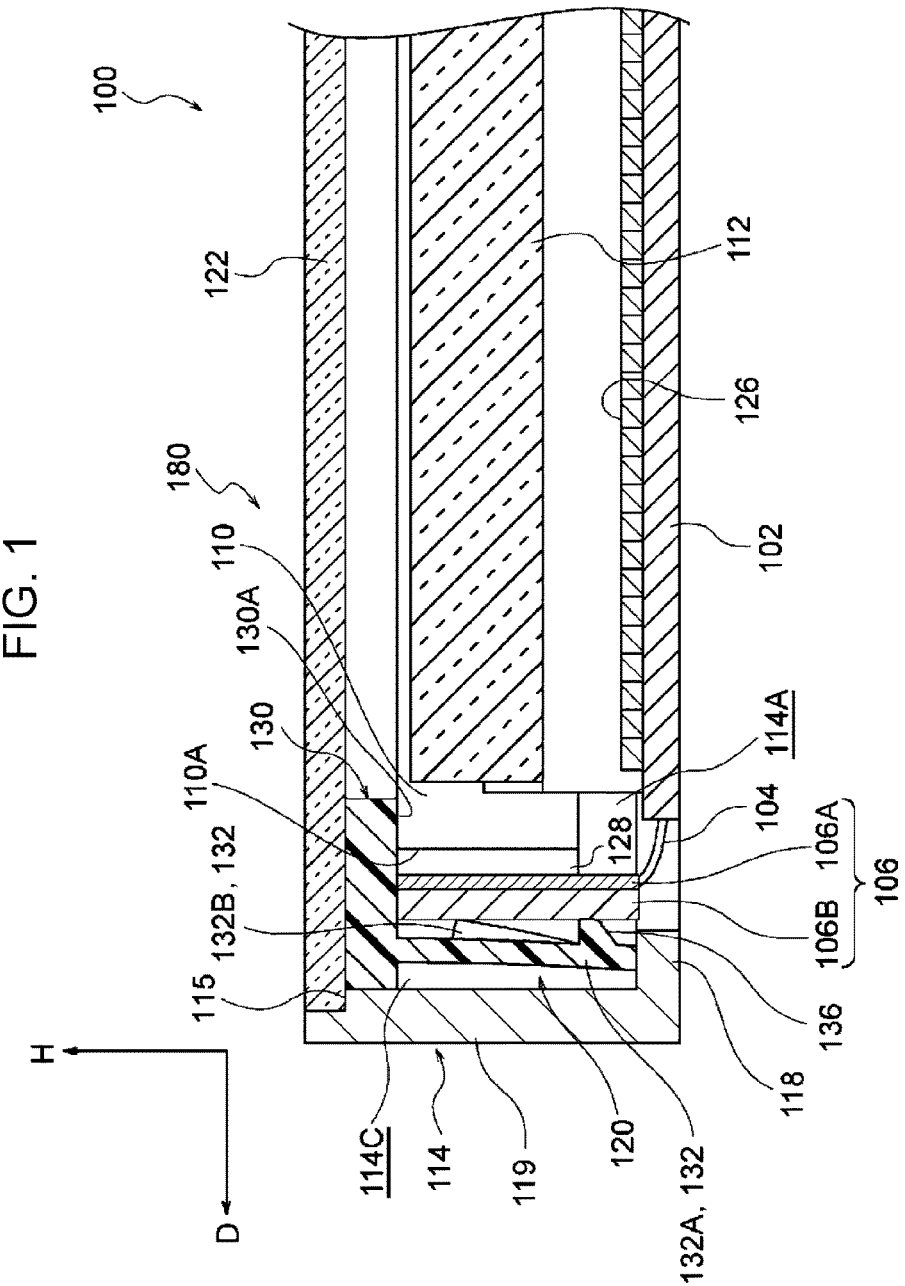
FIG. 1 is a sectional view illustrating an image reading device and a light emitting device according to a first exemplary embodiment of the present invention.

An example of a light emitting device, an image reading device, and an image forming apparatus according to a first exemplary embodiment of the present invention will be described with reference to FIG. 1 to FIG. 19. Note that, arrow H, arrow W, and arrow D that are illustrated in the drawings respectively indicate a top-bottom direction of the image forming apparatus (the vertical direction), a width direction of the image forming apparatus (the horizontal direction), and a depth direction of the image forming apparatus (the horizontal direction).

(Overall Configuration)

Figure 17:
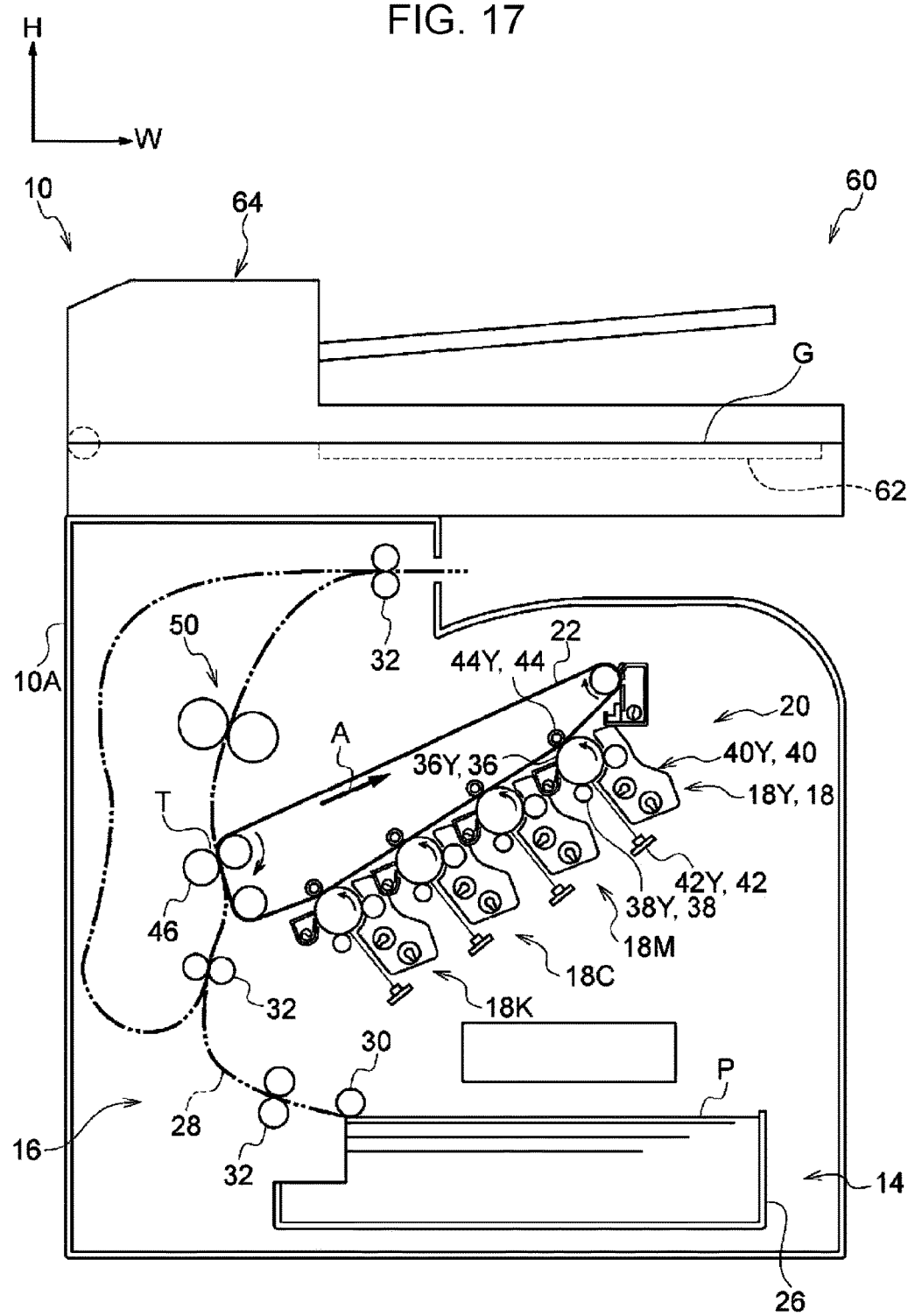
FIG. 17 is a schematic diagram illustrating the image forming apparatus according to the first exemplary embodiment of the present invention.

As illustrated in FIG. 17, an image forming apparatus 10 according to the first exemplary embodiment includes an accommodating unit 14 in which sheet members P serving as recording media are accommodated, a transport unit 16 that transports the sheet members P, which are accommodated in the accommodating unit 14, an image forming section 20 that performs an image forming operation on the sheet members P transported by the transport unit 16 from the accommodating unit 14, and an image reading section 60 that reads images formed on documents G. The accommodating unit 14, the transport unit 16, the image forming section 20, and the image reading section 60 are arranged in this order from the lower side to the upper side in the top-bottom direction (the direction of arrow H).

[Accommodating Unit]

The accommodating unit 14 includes an accommodating member 26 that is capable of being drawn out from a housing 10A of the image forming apparatus 10 toward the near side in a depth direction of the image forming apparatus 10 (hereinafter referred to as apparatus depth direction), and the sheet members P are stacked in the accommodating member 26. The accommodating unit 14 further includes a delivery roller 30 that sends out one of the sheet members P stacked in the accommodating member 26, the sheet member P being at the top of the sheet members P, to a transport path 28 included in the transport unit 16.

[Transport Unit]

The transport unit 16 includes plural transport rollers 32 that transport the sheet members P along the transport path 28.

[Image Forming Section]

The image forming section 20 includes four image forming units 18Y, 18M, 18C, and 18K respectively corresponding to yellow (Y), magenta (M), cyan (C), and black (K). Note that, in the following description, when it is not necessary to describe the image forming units 18Y, 18M, 18C, and 18K in such a manner as to be distinguished in terms of color, the letters Y, M, C, and K may sometimes be omitted.

The image forming units 18 for the corresponding colors are detachable from the housing 10A. In addition, each of the image forming units 18 for the corresponding colors includes an image carrier 36, a charging roller 38 that charges a surface of the image carrier 36, and an exposure device 42 that radiates exposure light onto the charged image carrier 36. Each of the image forming units 18 for the corresponding colors further includes a developing device 40 that develops an electrostatic latent image that is formed as a result of the above-mentioned exposure device 42 irradiating the charged image carrier 36 and visualizes the electrostatic latent image as a toner image.

The image forming section 20 further includes an endless transfer belt 22 that moves circularly in the direction of arrow A in FIG. 17 and first transfer rollers 44 that transfer toner images formed by the image forming units 18 for the corresponding colors onto the transfer belt 22. The image forming section 20 further includes a second transfer roller 46 that transfers toner images that have been transferred to the transfer belt 22 onto one of the sheet members P and a fixing device 50 that fixes toner images that have been transferred to one of the sheet members P onto the sheet member P by applying heat and pressure to the sheet member P.

[Image Reading Section]

Figure 16:
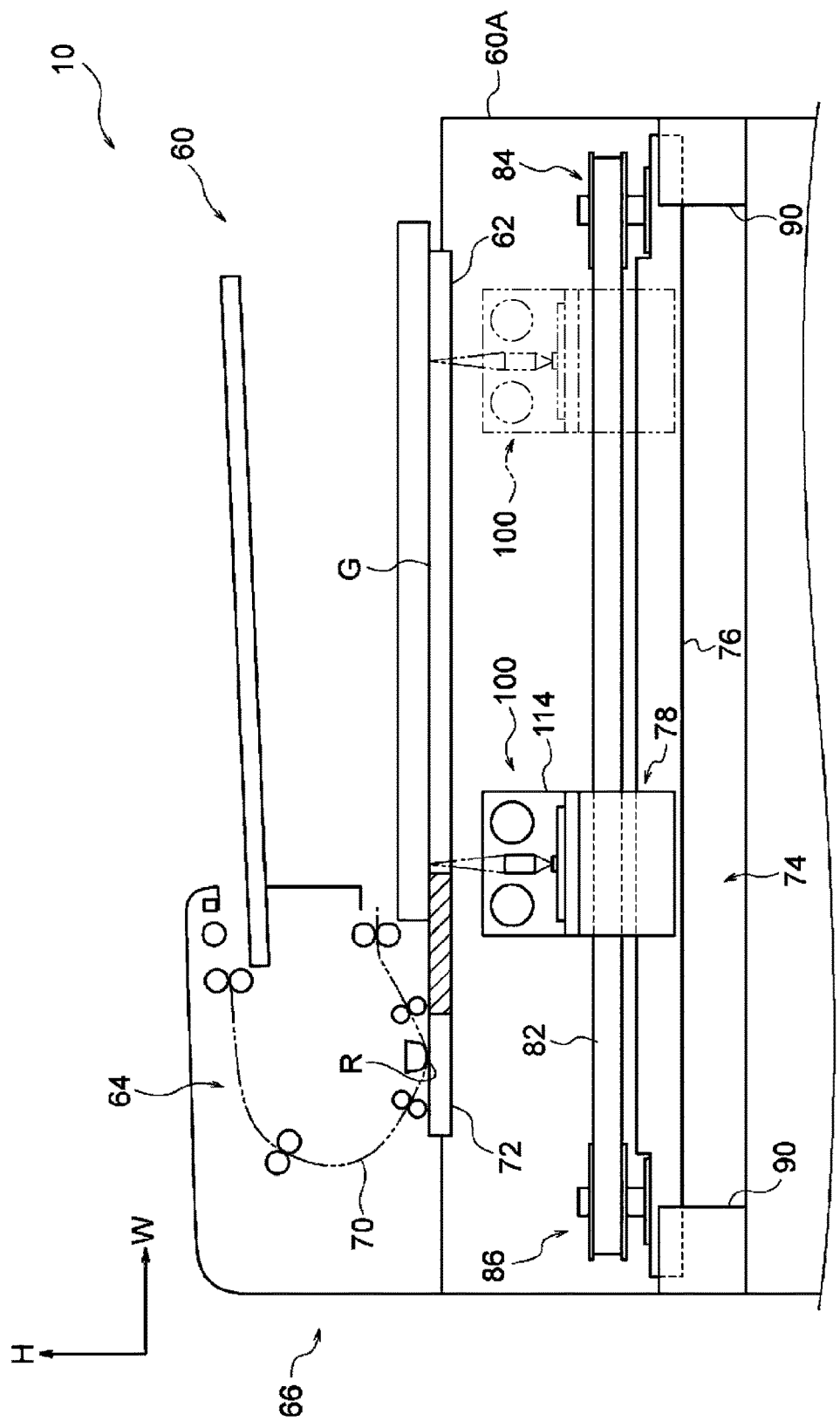
FIG. 16 is a front view illustrating the image reading section of the image forming apparatus according to the first exemplary embodiment of the present invention.

As illustrated in FIG. 16, the image reading section 60 includes a first transparent plate 62 (a so-called platen glass) on which one of the documents G is placed when an image of the document G is read and a second transparent plate 72 that is disposed on one side of the first transparent plate 62 (on the left-hand side of the first transparent plate 62 in FIG. 16) in a width direction of the image forming apparatus 10 (hereinafter referred to as apparatus width direction). The first transparent plate 62 and the second transparent plate 72 are fitted into an upper portion of a housing 60A of the image reading section 60.

An opening and closing cover 66 that opens and closes to cover and uncover the first transparent plate 62 and the second transparent plate 72 is disposed above the first transparent plate 62 and the second transparent plate 72. A transport device 64 (a so-called auto document feeder (ADF)) is disposed in the opening and closing cover 66, and the transport device 64 transports the documents G along a transport path 70 that is formed in the opening and closing cover 66 and causes each of the documents G to pass through a document reading position R that is located above the second transparent plate 72.

In addition, an image reading device 100 is disposed in the housing 60A, and the image reading device 100 reads an image of one of the documents G that is placed on the first transparent plate 62 and reads an image of one of the documents G that is transported by the transport device 64 to the document reading position R. The image reading section 60 further includes a driving device 74 that drives the image reading device 100 in the apparatus width direction.

Figure 13:
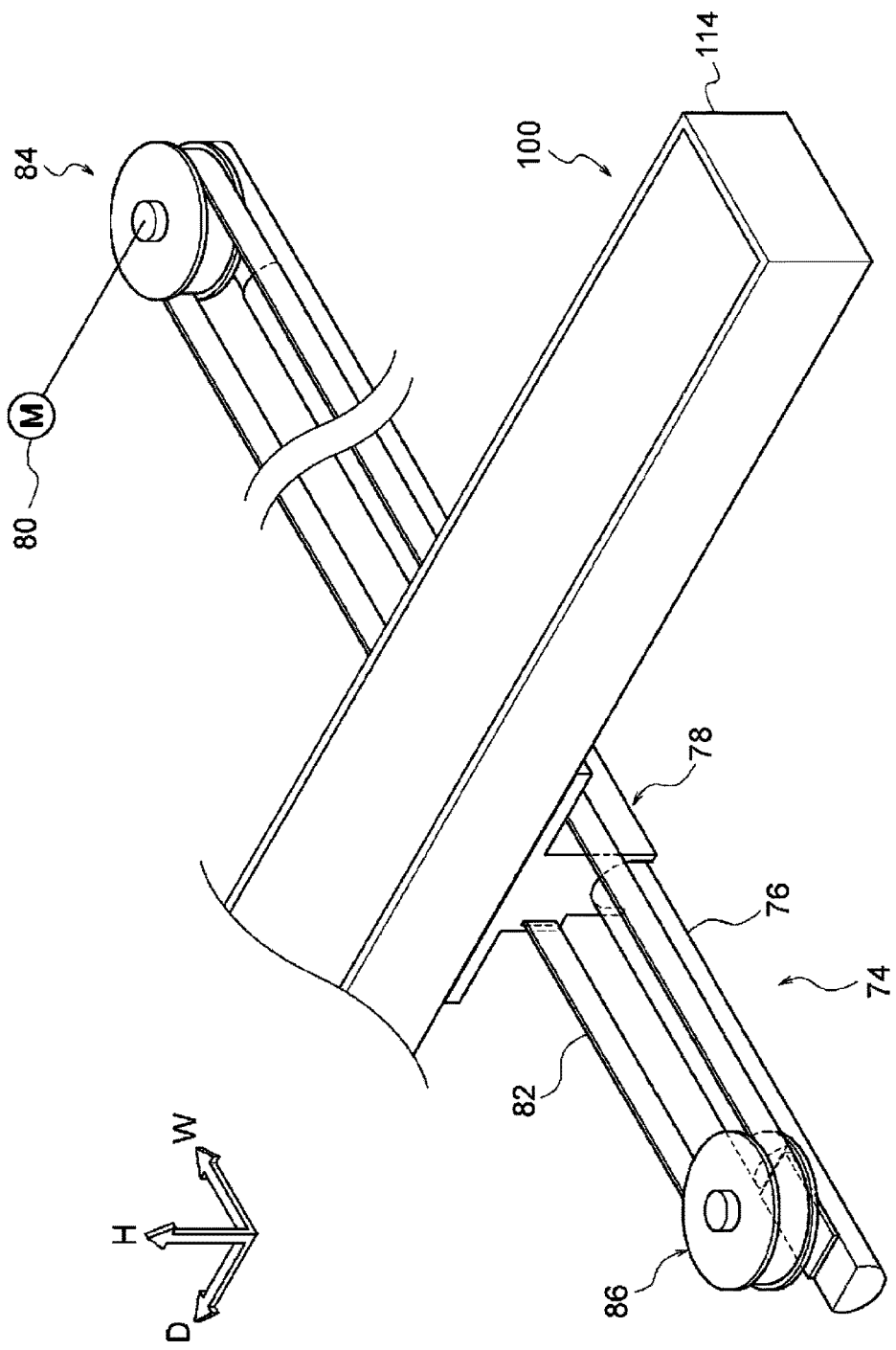
FIG. 13 is a perspective view illustrating the image reading section of the image forming apparatus according to the first exemplary embodiment of the present invention.

As illustrated in FIG. 13 and FIG. 16, the driving device 74 includes a shaft 76 extending in the apparatus width direction (the direction of movement of the image reading device 100) and a sliding member 78 that is attached to the bottom surface of a housing 114 of the image reading device 100 and that is slidably supported by the shaft 76.

The driving device 74 further includes a motor 80, a drive pulley 84 driven and rotates as a result of receiving a driving force that is transmitted from the motor 80, a driven pulley 86 that is driven and rotates, and an endless belt 82 that has an endless loop shape and that is wound around the drive pulley 84 and the driven pulley 86. The drive pulley 84 is mounted on one end portion of the shaft 76, and the driven pulley 86 is mounted on the other end portion of the shaft 76.

Figure 12:
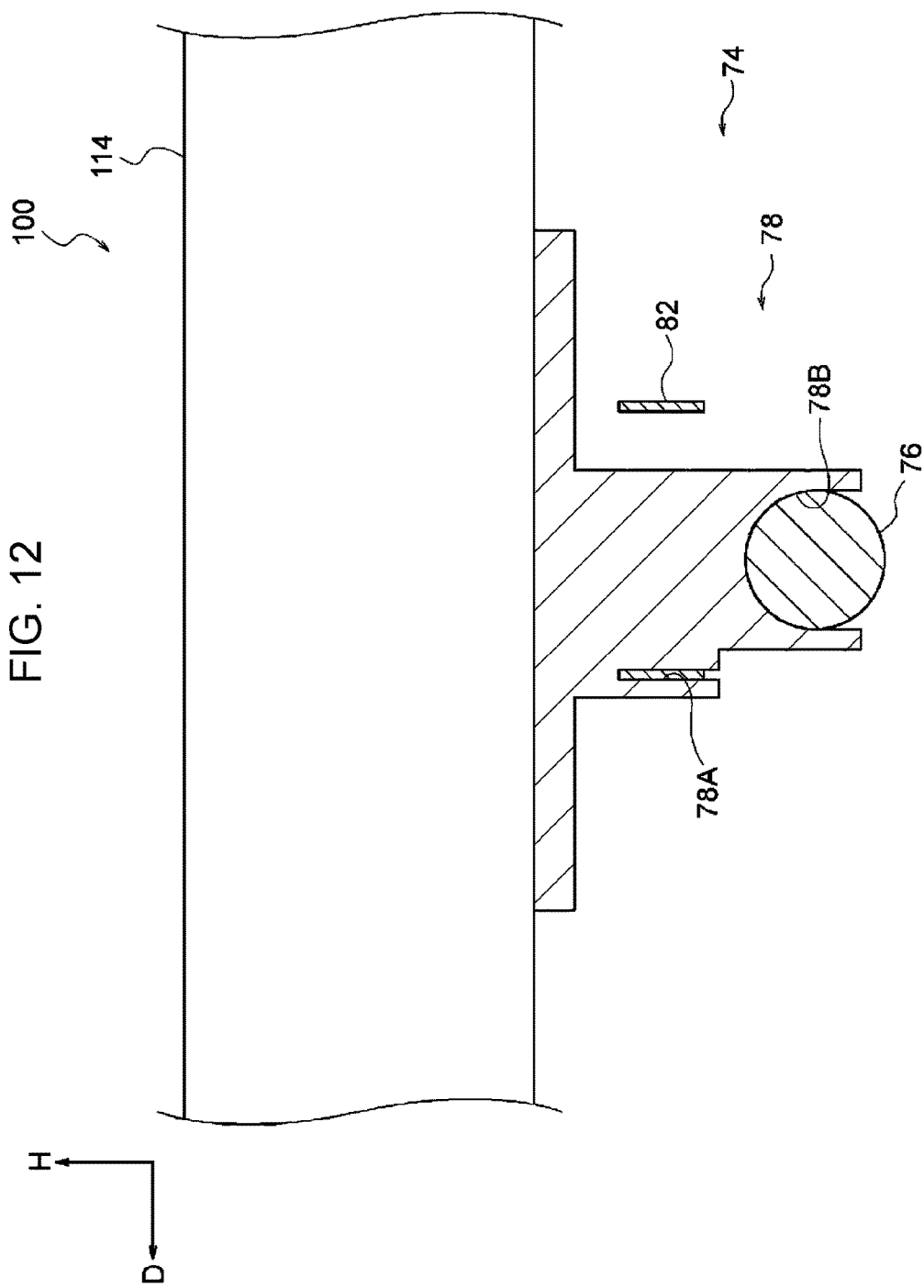
FIG. 12 is a sectional view illustrating an image reading section of the image forming apparatus according to the first exemplary embodiment of the present invention.
Figure 14:
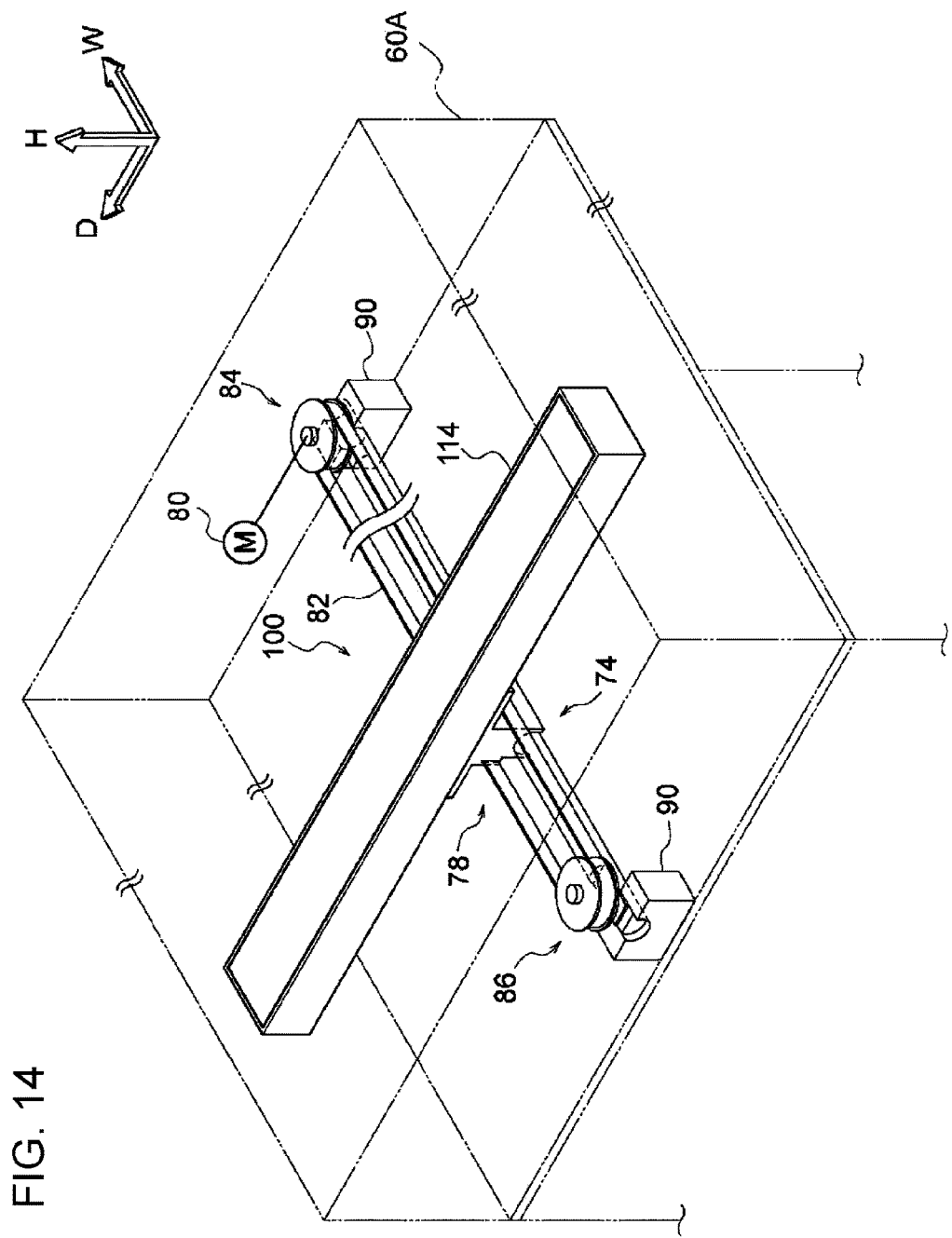
FIG. 14 is a perspective view illustrating the image reading section of the image forming apparatus according to the first exemplary embodiment of the present invention.

As illustrated in FIG. 14, the sliding member 78 is attached to a center portion of the bottom surface of the housing 114 in the apparatus depth direction. As illustrated in FIG. 12, the sliding member 78 extends in the top-bottom direction and has a slit 78A into which a portion of the endless belt 82 is fitted and a sliding surface 78B that has a semicircular shape when viewed in the apparatus width direction and that slides on the shaft 76.

As illustrated in FIG. 14, in the housing 60A, a pair of support portions 90 that support the end portions of the shaft 76 from below are formed integrally with the housing 60A.

Note that details of the image reading device 100 will be described later.

(Operation of Image Forming Apparatus)

In the image forming apparatus 10, an image is formed in the following manner.

Figure 15:
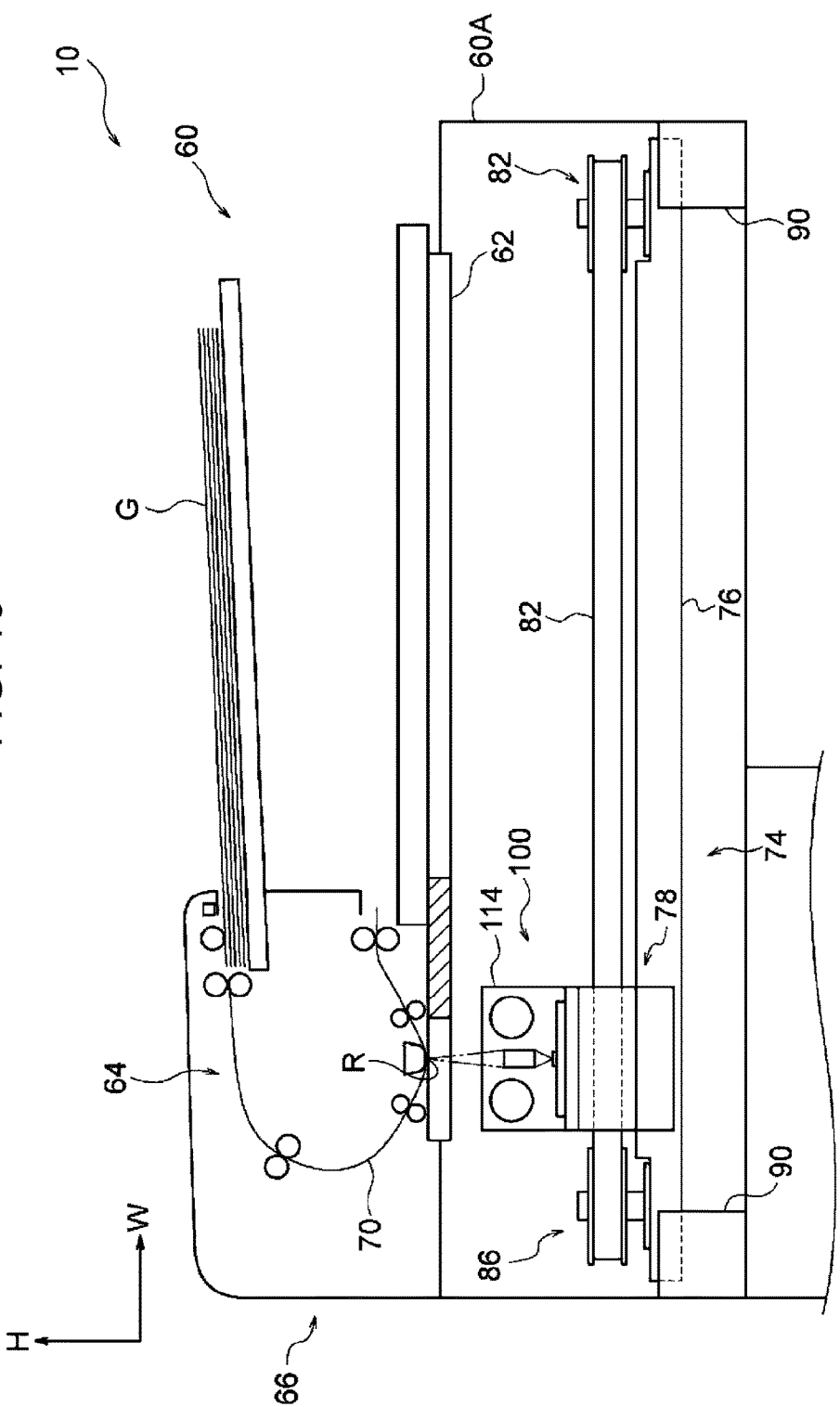
FIG. 15 is a front view illustrating the image reading section of the image forming apparatus according to the first exemplary embodiment of the present invention.

First, the image reading section 60 reads an image of one of the documents G. More specifically, when an image of one of the documents G that is transported by the transport device 64 is read, as illustrated in FIG. 15, the image reading device 100 moves to a transport reading position located on one side in the apparatus width direction as a result of the driving force of the motor 80 (see FIG. 14) being transmitted thereto via the endless belt 82 and stops at the transport reading position. Then, the image reading device 100 located at the transport reading position reads the image of the document G transported by the transport device 64.

In contrast, when an image of one of the documents G that is placed on the first transparent plate 62 is read, as illustrated in FIG. 16, the image reading device 100 that is located at a reading start position (the position where the image reading device 100 is indicated by a solid line in FIG. 16) moves along the first transparent plate 62 toward a reading end position (the position where the image reading device 100 is indicated by a two-dot chain line in FIG. 16) while reading the image of the document G.

Subsequently, each of the exposure devices 42 radiates, on the basis of image information read by the image reading section 60, the exposure light onto the surface of a corresponding one of the image carriers 36 for the different colors that has been charged by the corresponding charging roller 38 so as to form an electrostatic latent image (see FIG. 17).

As a result, electrostatic latent images that correspond to data are formed on the surfaces of the image carriers 36 for the different colors. In addition, the developing devices 40 for the different colors develop and visualize the electrostatic latent images as toner images. The toner images formed on the surfaces of the image carriers 36 for the different colors are transferred onto the transfer belt 22 by the first transfer rollers 44.

Then, one of the sheet members P sent out from the accommodating member 26 to the transport path 28 by the delivery roller 30 is sent to a transfer position T at which the transfer belt 22 and the second transfer roller 46 are brought into contact with each other. At the transfer position T, the sheet member P is transported between the transfer belt 22 and the second transfer roller 46, so that the toner images on a surface of the transfer belt 22 are transferred onto the sheet member P.

The toner images that have been transferred to the sheet member P are fixed onto the sheet member P by the fixing device 50. Then, the sheet member P to which the toner images have been fixed is discharged to the outside of the housing 10A by the transport rollers 32.

(Configuration of Principal Portion)

The image reading device 100 will now be described.

Figure 9:
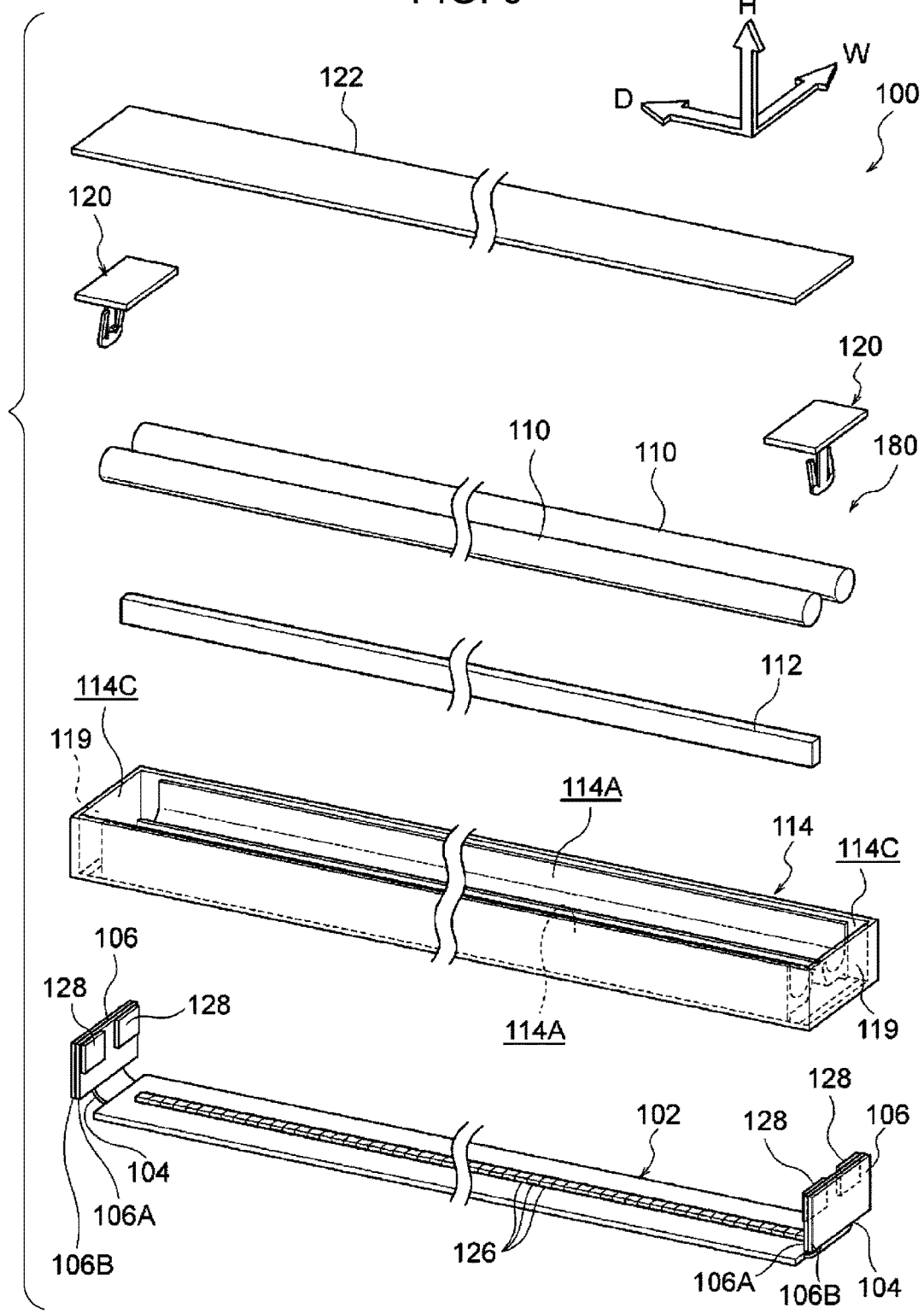
FIG. 9 is an exploded perspective view illustrating the image reading device and other components according to the first exemplary embodiment of the present invention.

The image reading device 100 (see FIG. 11) is configured to read images formed on the documents G (objects) by using a known contact image sensor (CIS) method. As illustrated in FIG. 9, the image reading device 100 includes a light receiving board 102, a pair of wiring cables 104 that are connected to the light receiving board 102, and rigid boards 106 that are connected to the respective wiring cables 104. The image reading device 100 further includes light emitting elements 128 that are mounted on the rigid boards 106, a pair of light-guide members 110 (lightguides) each of which has a columnar shape, a rod lens array 112 having a rectangular parallelepiped shape, and the housing 114. The image reading device 100 further includes a pair of pressing members 120 that are disposed so as to sandwich the light-guide members 110 in the longitudinal direction of the light-guide members 110 and a glass plate 122 that covers the top surface of the housing 114. The rod lens array 112 is an example of a guide member.

The housing 114, the light-guide members 110, the light emitting elements 128, the rigid boards 106, and the pressing members 120 are included in a light emitting device 180 that radiates light toward one of the documents G.

[Housing 114]

Figure 8:
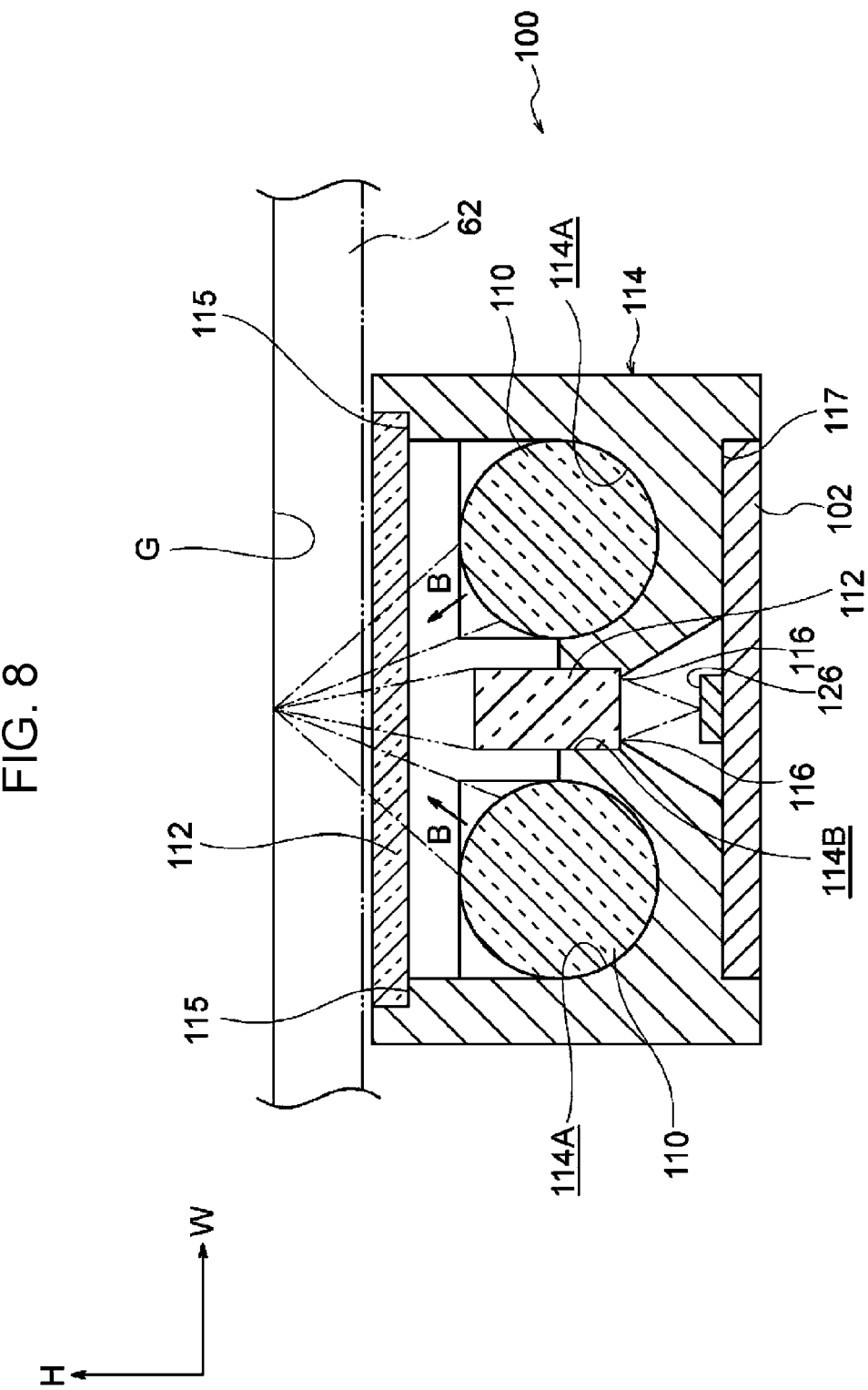
FIG. 8 is a cross-sectional view illustrating the image reading device according to the first exemplary embodiment of the present invention.

As illustrated in FIG. 9, the housing 114 has the shape of a box extending in the apparatus depth direction. As illustrated in FIG. 8, a pair of lightguide accommodating portions 114A in each of which one of the pair of light-guide members 110 is accommodated and a lens accommodating portion 114B in which the rod lens array 112 is accommodated are formed in the housing 114, and the lens accommodating portion 114B is formed between the pair of lightguide accommodating portions 114A. In addition, in the housing 114, a pair of base-plate accommodating portions 114C are formed in such a manner as to sandwich the lightguide accommodating portions 114A in the apparatus depth direction as illustrated in FIG. 9, and one of the rigid boards 106 and a portion of one of the pressing members 120 are accommodated in each of the pair of base-plate accommodating portions 114C.

—Lightguide Accommodating Portion—

As illustrated in FIG. 8 and FIG. 9, the pair of lightguide accommodating portions 114A are formed side by side in the apparatus width direction, and each of the lightguide accommodating portions 114A extends in the apparatus depth direction. The cross section of each of the lightguide accommodating portions 114A when viewed in a direction crossing the longitudinal direction of the lightguide accommodating portions 114A is a semicircular shape that is open at the top.

—Lens Accommodating Portion—

As illustrated in FIG. 8, the lens accommodating portion 114B is formed between the pair of lightguide accommodating portions 114A in the apparatus width direction and extends through a portion of the housing 114 in the top-bottom direction. In addition, a pair of protrusions 116 that support end portions of the bottom surface of the rod lens array 112 in the apparatus width direction are formed on the lens accommodating portion 114B.

—Base-Plate Accommodating Portion—

As illustrated in FIG. 9, the pair of base-plate accommodating portions 114C are formed to be located on the far side and the near side in the apparatus depth direction with respect to the lightguide accommodating portions 114A. More specifically, as illustrated in FIG. 1, each of the base-plate accommodating portions 114C is formed between one of end wall portions 119 of the housing 114 in the apparatus depth direction and the lightguide accommodating portions 114A. Flanges 118 are formed below the respective base-plate accommodating portions 114C, and each of the flanges 118 is brought into contact with the lower end of one of the pressing members 120 from below.

—Others—

As illustrated in FIG. 1 and FIG. 8, step portions 115 that support edge portions of the glass plate 122 from below are formed in an upper portion of the housing 114. In addition, as illustrated in FIG. 8, a spot-face surface 117 that is in contact with the top surface of the light receiving board 102 is formed in a lower portion of the housing 114.

[Light-Guide Member 110]

As illustrated in FIG. 8, each of the light-guide members 110 is accommodated in one of the lightguide accommodating portions 114A of the housing 114 and is formed of a transparent material (e.g., an acrylic resin) into a columnar shape extending in the apparatus depth direction. The pair of light-guide members 110 are provided side by side in the apparatus width direction. The apparatus depth direction is an example of one direction, and the apparatus width direction is an example of a crossing direction.

Each of the light-guide members 110 is disposed in an arc-shaped portion of one of the lightguide accommodating portions 114A and is fixed to the housing 114 by a fixing portion (not illustrated) in such a manner as to be capable of expanding and contracting in the apparatus depth direction. More specifically, a center portion of each of the light-guide members 110 in the apparatus depth direction is clamped by the fixing portion, which is included in the housing 114, in the radial direction of the light-guide member 110, so that the light-guide member 110 is fixed to the housing 114 such that the light-guide member 110 is capable of expanding and contracting in the apparatus depth direction (in the longitudinal direction of the light-guide member 110). In a state where each of the light-guide members 110 is fixed to the housing 114, end surfaces 110A of the light-guide member 110 are spaced apart from the respective wall portions 119 of the housing 114 (see FIG. 1).

In addition, each of the light-guide members 110 includes a reflective member (not illustrated) that causes light that has entered the end surfaces 110A of the light-guide member 110 to travel in the longitudinal direction and to be emitted above the rod lens array 112 (in the direction of arrow B in FIG. 8).

[Rod Lens Array 112]

As illustrated in FIG. 8, the rod lens array 112 is accommodated in the lens accommodating portion 114B of the housing 114, and the external shape of the rod lens array 112 is a rectangular parallelepiped shape extending in the apparatus depth direction. The rod lens array 112 includes plural rod lenses (not illustrated) that are formed to vertically extend and that are arranged in the apparatus depth direction. In addition, the end portions of the bottom surface of the rod lens array 112 in the apparatus width direction are supported by the protrusions 116, and the rod lens array 112 is fixed to the housing 114 by a fixing unit (not illustrated). In this state, the end portions of the rod lens array 112 in the longitudinal direction are spaced apart from the respective wall portions 119 of the housing 114.

[Light Receiving Board 102]

As illustrated in FIG. 8, the plate-thickness direction of the light receiving board 102 is parallel to the top-bottom direction, and the light receiving board 102 is disposed at the lower end portion of the housing 114. In addition, the light receiving board 102 is fixed to the housing 114 by a fixing unit (not illustrated) in a state where the top surface of the light receiving board 102 is in contact with the spot-face surface 117 of the housing 114.

When viewed from above, the light receiving board 102 has a rectangular shape extending in the apparatus depth direction. Plural light receiving elements 126 are mounted on the top surface of the light receiving board 102 and arranged in the apparatus depth direction. In addition, the light receiving elements 126 mounted on the light receiving board 102 face the rod lens array 112 in the top-bottom direction (see FIG. 8).

[Wiring Cable 104]

The pair of wiring cables 104 are provided as illustrated in FIG. 9 such that the base ends thereof are connected to the end portions of the light receiving board 102 in the apparatus depth direction and are so-called flexible flat cables. The base end of one of the wiring cables 104 is connected to an end portion of the light receiving board 102 that is located on the far side in the apparatus depth direction (the left-hand side in FIG. 9), and the base end of the other of the wiring cables 104 is connected to the other end portion of the light receiving board 102 that is located on the near side in the apparatus depth direction (the right-hand side in FIG. 9).

[Rigid Board 106]

The pair of rigid boards 106 are provided as illustrated in FIG. 9 such that each of the rigid boards 106 is connected to the tip end of one of the wiring cables 104. Each of the rigid boards 106 includes a body portion 106A that is a so-called flexible printed circuit and a heat sink 106B that is formed of an aluminum plate having a thickness of 1 mm and that is stacked on the body portion 106A. The plate-thickness directions of the pair of rigid boards 106 are parallel to the apparatus depth direction, and the pair of rigid boards 106 are spaced apart from each other in the apparatus depth direction. In addition, the body portions 106A of the pair of rigid boards 106 face each other in the apparatus depth direction.

When viewed in the apparatus depth direction, each of the rigid boards 106 has a rectangular shape extending in the apparatus width direction. Two light emitting diodes (LED) 128 (hereinafter referred to as light emitting elements 128) that are arranged in the apparatus width direction are mounted on one surface of each of the rigid boards 106 (the surfaces of the rigid boards 106 facing each other).

As illustrated in FIG. 1, each of the rigid boards 106 is accommodated in one of the base-plate accommodating portions 114C of the housing 114 in a state of facing one of the end surfaces 110A of each of the light-guide members 110. In this state, lower end portions of the rigid boards 106 are supported by the housing 114, and the rigid board 106 are movable in the apparatus depth direction with respect to the housing 114.

Figure 10:
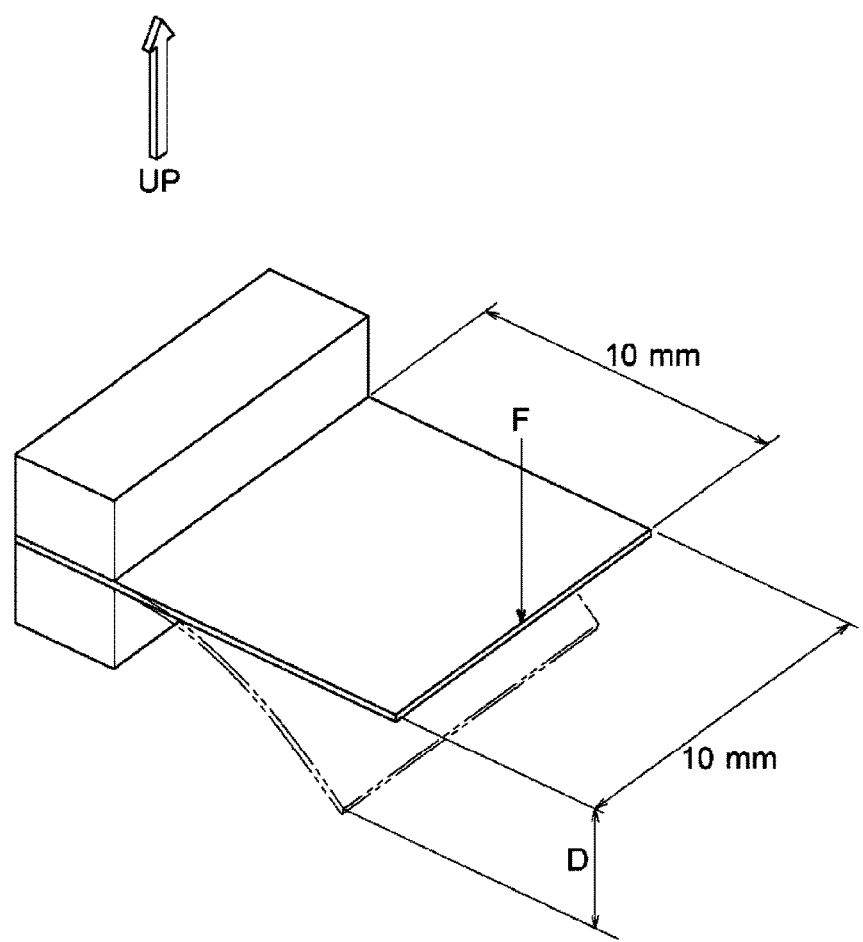
FIG. 10 is a diagram used for defining the rigid board of the light emitting device according to the first exemplary embodiment of the present invention.

Here, as illustrated in FIG. 10, each of the rigid boards 106 is a board (or a member made of the same material as the board) having a width of 10 mm that is supported in a cantilever manner such that, when a portion of the board that is 10 mm away from a support end of the board is pressed with a force F of 9.8 N from above, the deflection amount D of the pressed portion is smaller than 1 mm.

[Light Emitting Element 128]

Figure 6:
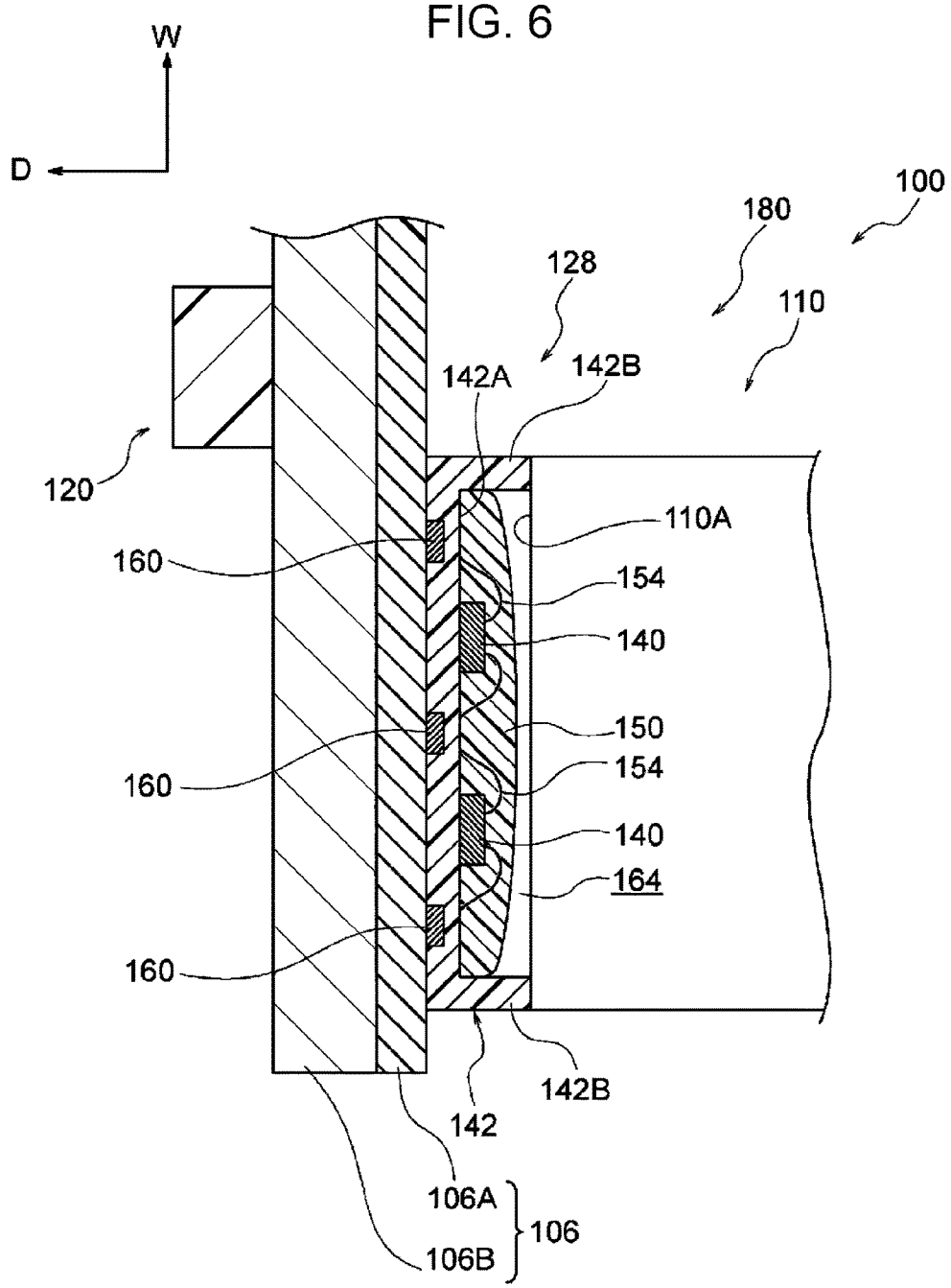
FIG. 6 is a sectional view illustrating a light emitting element and other components of the light emitting device according to the first exemplary embodiment of the present invention.

As illustrated in FIG. 6, each of the light emitting elements 128 includes plural light emitting chips 140 that radiate light (emit light), a sealing member 150 that seals the light emitting chips 140, a support member 142 that supports the light emitting chips 140 and the sealing member 150, and plural wires 154. Here, the term "seal" refers to covering the light emitting chips 140 with an insulating material in order to protect the light emitting chips 140. Each of the light emitting chips 140 is an example of a light emitting portion.

—Support Member 142—

The support members 142 are disposed on the side opposite to the side on which the light-guide members 110 are disposed with the light emitting chips 140 interposed between the support members 142 and the light-guide members 110 and are each formed in a recessed manner so as to be open toward the end surfaces 110A of the light-guide members 110. As an example, the support members 142 are formed by using a polystyrene resin having a Young's modulus of 2,000 MPa.

Figure 7:
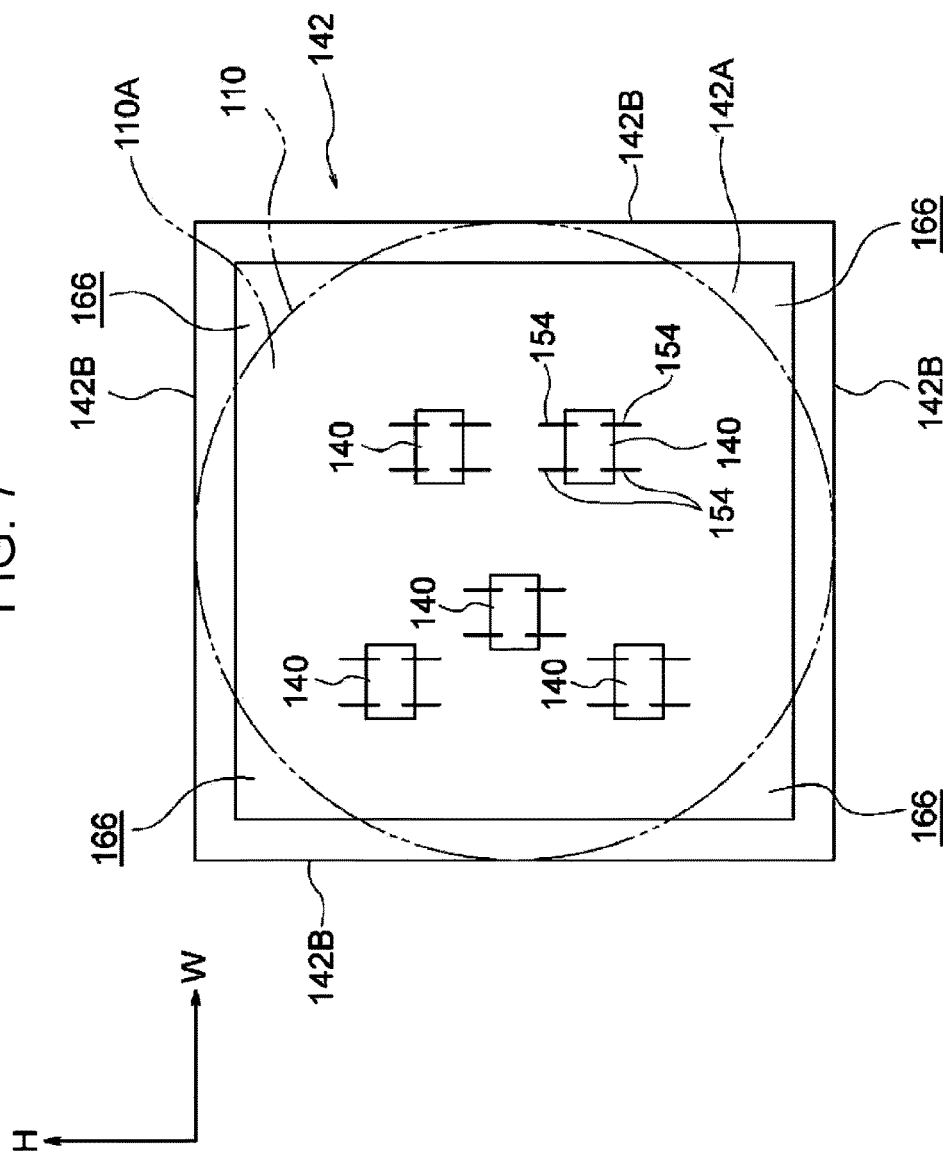
FIG. 7 is a front view illustrating the light emitting element and other components of the light emitting device according to the first exemplary embodiment of the present invention.

In addition, when viewed in the longitudinal direction of the light-guide members 110 (the apparatus depth direction), each of the support members 142 has a rectangular shape as illustrated in FIG. 7, and the length of one side of the support member 142 is approximately equal to the diameter of the light-guide members 110.

More specifically, as illustrated in FIG. 6 and FIG. 7, each of the support members 142 includes a rectangular bottom plate 142A that is in contact with one of the rigid boards 106 and projecting plates 142B each of which projects from one side of the bottom plate 142A toward the end surfaces 110A of the light-guide members 110. An electrical circuit (not illustrated) is formed on the bottom plate 142A. In addition, plural terminals 160 are formed in a portion of the bottom plate 142A that is located on the side on which the corresponding rigid board 106 is present, and each of the plural terminals 160 is electrically connected to a terminal (not illustrated) that is formed in the rigid board 106. Each of the projecting plates 142B is an example of a projecting portion.

In a state where the pressing members 120 (see FIG. 1) are pressing the light emitting elements 128 against the end surfaces 110A of the light-guide members 110 via the rigid boards 106, as illustrated in FIG. 7, edge portions of the projecting plates 142B are each partially in contact with one of the end surfaces 110A of the corresponding light-guide member 110, and the portion of each of the edge portions that is in contact with the end surface 110A is located at the center of the edge portion in the longitudinal direction of the edge portion. In other words, in the each of the support members 142, the portions of the edge portions of the projecting plates 142B that are in contact with one of the end surfaces 110A of the corresponding light-guide member 110 are equally spaced in the circumferential direction of the end surface 110A. In addition, in each of the edge portions of the projecting plates 142B, end portions in the longitudinal direction of the edge portion are spaced apart from the end surface 110A of the light-guide member 110.

—Light Emitting Chip 140, Wire 154—

Each of the plural light emitting chips 140 is mounted on the bottom plate 142A of one of the support members 142 so as to be located on the side on which the end surfaces 110A of the light-guide members 110 are present. The light emitting chips 140 are formed in a similar shape, which is a rectangular parallelepiped shape. The height of each of the light emitting chips 140 is smaller than the height of each of the projecting plates 142B of the support members 142. Each of the wires 154 electrically connects one of the light emitting chips 140 to an electrical circuit (not illustrated) formed on the corresponding bottom plate 142A.

—Sealing Member 150—

As an example, the sealing members 150 are formed by using a transparent silicon resin having a Young's modulus of 1 MPa. In other words, a resin material having a Young's modulus smaller than that of the resin material used for making the support members 142 is used for making the sealing members 150.

As illustrated in FIG. 6, in a state where the edge portion of each of the projecting plates 142B is in contact with the end surface 110A of the corresponding light-guide member 110, each of the sealing members 150 is spaced apart from the end surface 110A of the light-guide member 110. As a result, a gap 164 is formed between the sealing member 150 and the end surface 110A of the light-guide member 110.

In addition, as mentioned above, in each of the projecting plates 142B, the end portions of the edge portion in the longitudinal direction are spaced apart from the corresponding light-guide member 110. Consequently, plural spaces 166 (see FIG. 7) that enable communication between the gaps 164 and the outside of the light emitting elements 128 are formed between the end portions of the edge portions of the projecting plates 142B in the longitudinal direction and the respective light-guide members 110. In each of the light-emitting devices 128, the spaces 166 are formed at equally spaced positions in the circumferential direction of the corresponding end surface 110A.

[Pressing Member 120]

Figure 4:
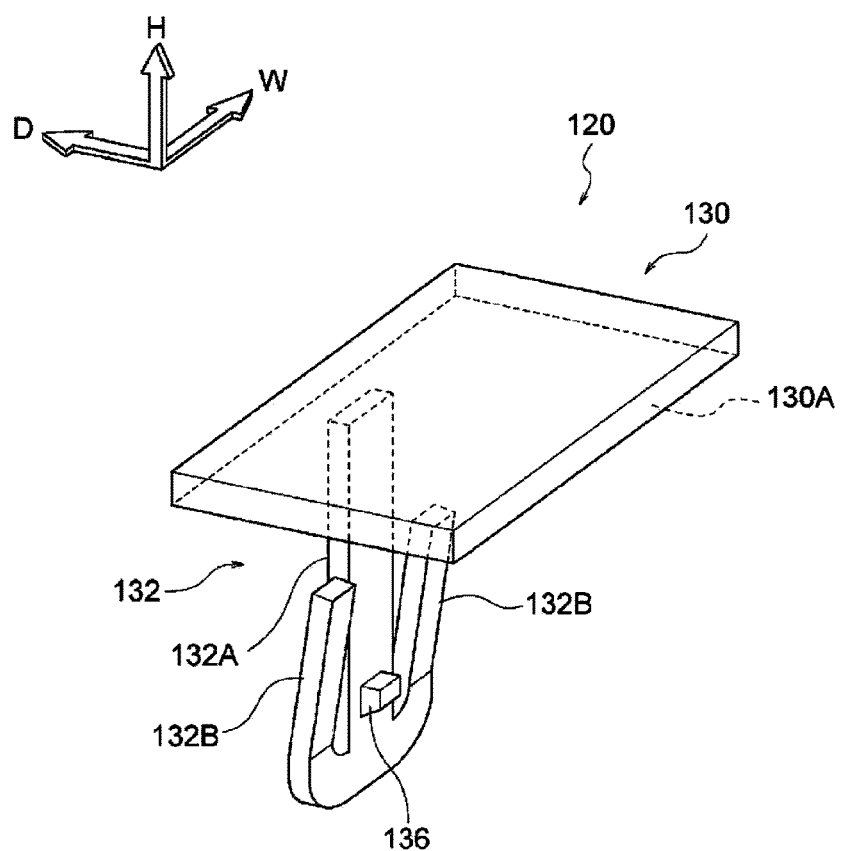
FIG. 4 is a perspective view illustrating a pressing member of the light emitting device according to the first exemplary embodiment of the present invention.
Figure 11:
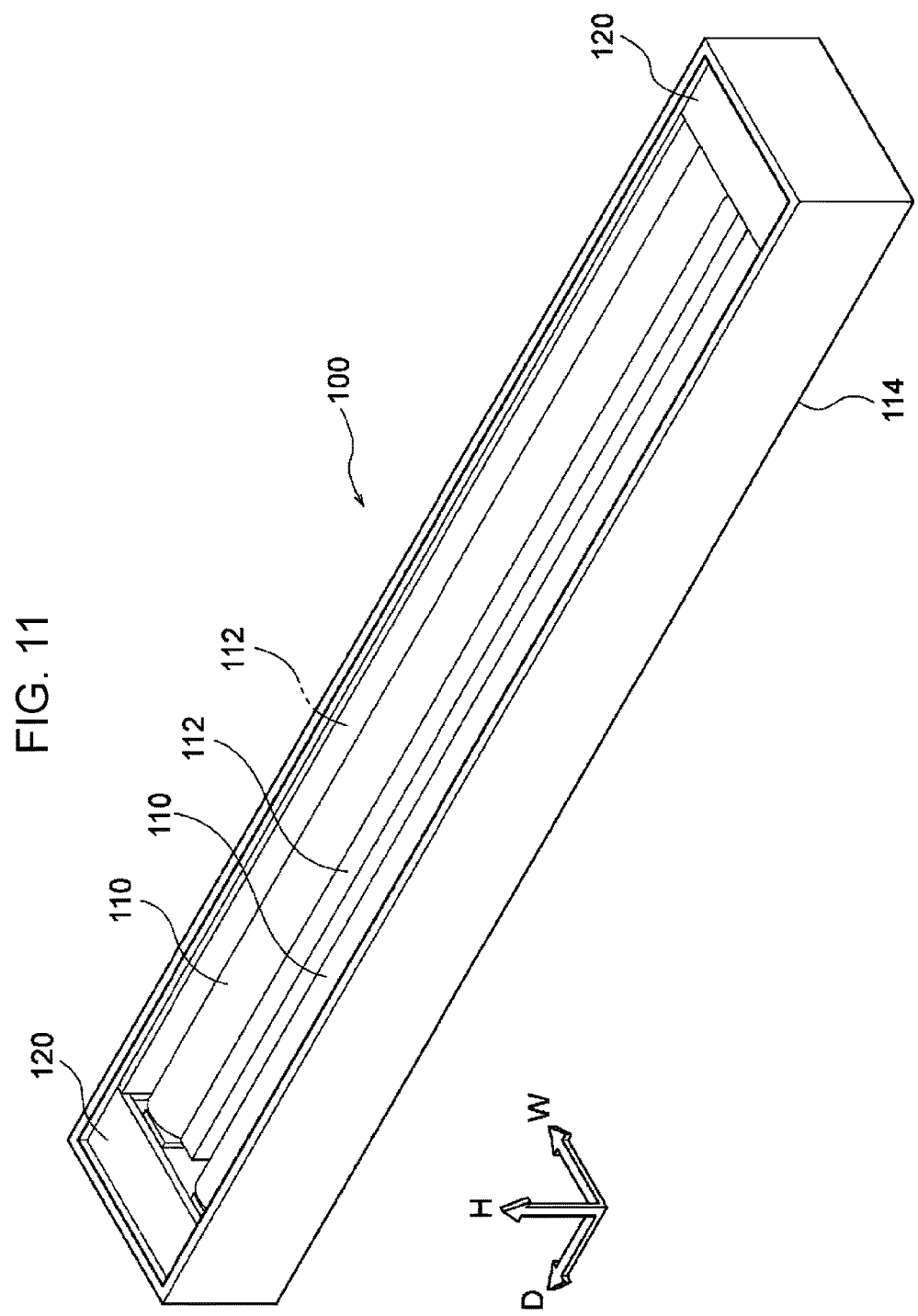
FIG. 11 is a perspective view illustrating the image reading device and other components according to the first exemplary embodiment of the present invention.

As illustrated in FIG. 9 and FIG. 11, the pair of pressing members 120 are arranged at the ends of the light-guide members 110 in the apparatus depth direction. As illustrated in FIG. 4, each of the pressing members 120 has an L shape when viewed in the apparatus width direction. Each of the pressing members 120 includes a top plate 130 whose plate-thickness direction is parallel to the top-bottom direction and a body 132 that is integrally fixed to the bottom surface 130A of the top plate 130 and that is positioned between one of the rigid boards 106 and one of the wall portions 119 of the housing 114 (see FIG. 1).

The body 132 includes a T-shaped member 132A and a pair of cantilever members 132B that are formed in a cantilever manner. The T-shaped member 132A has an upper end portion that is fixed to the bottom surface 130A of the top plate 130 and that extends downward and a lower end portion that has a T shape extending in the apparatus width direction when viewed in the apparatus depth direction. The pair of cantilever members 132B are fixed to portions of the lower end portion of the T-shaped member 132A, the portions extending in the apparatus width direction.

The pair of cantilever members 132B extend in the top-bottom direction and are arranged in the apparatus width direction. The lower end portions of the cantilever members 132B are fixed ends, and the upper end portions of the cantilever members 132B are free ends. The upper end portions of the pair of cantilever members 132B project toward the corresponding rigid board 106 (see FIG. 1), whereas the T-shaped member 132A does not project toward the rigid board 106. The cantilever members 132B are capable of being elastically deformed in the direction in which the cantilever members 132B project. Thus, the upper end portions of the cantilever members 132B come into contact with the rigid board 106.

In addition, a protrusion 136 is formed on a lower portion of each of the T-shaped members 132A, and the protrusion 136 protrudes toward a corresponding one of the rigid boards 106 (see FIG. 1). The T-shaped member 132A is capable of being elastically deformed in the direction in which the protrusion 136 protrudes. Thus, an end of the protrusion 136 comes into contact with the rigid board 106.

After the light-guide members 110, the rod lens array 112, and the light receiving board 102 have been accommodated in the housing 114, and then the rigid boards 106 have been accommodated in the housing 114, the pressing members 120 are accommodated into the housing 114 from above the housing 114. In addition, as illustrated in FIG. 1, the pressing members 120 are accommodated in the housing 114 such that the lower ends of the bodies 132 are in contact with the corresponding flanges 118 of the housing 114.

The bottom surfaces 130A of the top plates 130 of the pressing members 120, which are accommodated in the housing 114, are brought into contact with end portions of the light-guide members 110 and end surfaces of the light emitting elements 128 from above. In this manner, the light-guide members 110 and the light emitting elements 128 are positioned with respect to the housing 114 in the top-bottom direction by the bottom surfaces 130A of the top plates 130.

Here, a plane that extends through an intermediate point C1 between the pair of light-guide members 110 in the apparatus width direction (an example of the crossing direction) and that is oriented in the apparatus width direction will be referred to as a reference plane M1. In this case, in a state where each of the pressing members 120 is accommodated in the housing 114, a contact portion 138A where an upper end portion of one of the cantilever members 132B and the corresponding rigid board 106 are in contact with each other and a contact portion 138B where an upper end portion of the other of the cantilever members 132B and the rigid board 106 are in contact with each other are located symmetrically to each other with respect to the reference plane M1. Note that the intermediate point C1 is a point that is located between one of the light-guide members 110 and the other of the light-guide members 110 and that is located at the same distance from both the light-guide members 110.

A contact portion 139 where the end of the protrusion 136 and the rigid board 106 are in contact with each other is located on the reference plane M1. When viewed in the apparatus depth direction, a line segment connecting the contact portion 138A, the contact portion 138B, and the contact portion 139 forms an isosceles triangle. In this manner, the pressing member 120 is in contact with the rigid board 106 at three portions (three points), which are the contact portion 138A, the contact portion 138B, and the contact portion 139 that deviates from a straight line passing through the contact portion 138A and the contact portion 138B.

Figure 5:
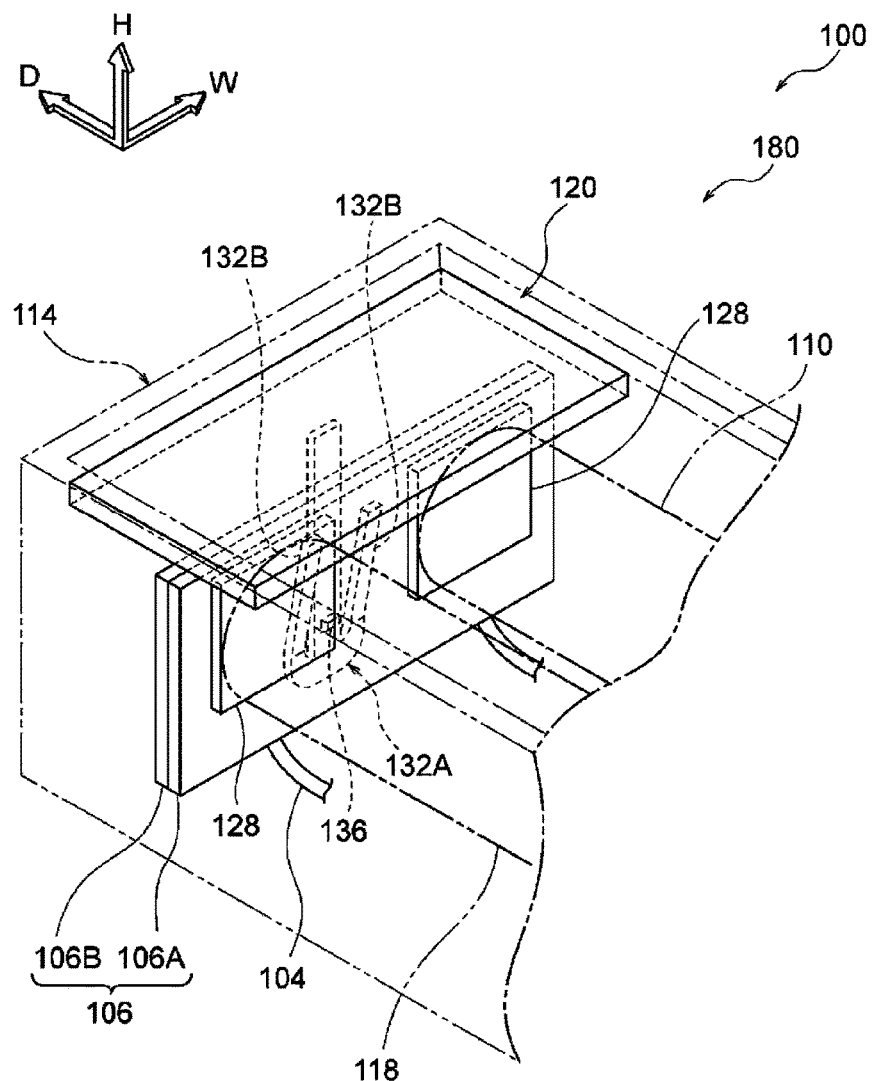
FIG. 5 is a perspective view illustrating the pressing member, a rigid board, light-guide members, and other components of the light emitting device according to the first exemplary embodiment of the present invention.

In this configuration, as illustrated in FIG. 1 and FIG. 5, the upper end portions of the pair of cantilever members 132B are in contact with the rigid board 106, and the pair of cantilever members 132B are deflected (elastically deformed). In addition, the end of the protrusion 136 is in contact with the rigid board 106, and the T-shaped member 132A is deflected (elastically deformed). As a result of the cantilever members 132B and the T-shaped member 132A being deflected in this manner, the pressing member 120 presses the light emitting elements 128 against the respective end surfaces 110A of the light-guide members 110 via the rigid board 106.

[Glass Plate]

As illustrated in FIG. 9, the plate thickness direction of the glass plate 122 is parallel to the top-bottom direction, and the glass plate 122 has a rectangular shape extending in the apparatus depth direction when viewed from above. As illustrated in FIG. 8, the glass plate 122 is fixed to the housing 114 by a fixing unit (not illustrated) in a state where the edge portions of the glass plate 122 are in contact with the step portions 115 of the housing 114 and is disposed so as to cover the top surface of the housing 114.

(Operation)

Operation of the image reading device 100 will now be described.

The light emitting elements 128 of the light emitting device 180 radiate light onto the end surfaces 110A of the light-guide members 110 (see FIG. 1). As a result, the light is incident on the end surfaces 110A of the light-guide members 110 of the light emitting device 180, and the light-guide members 110 guide the incident light in the longitudinal direction of the light-guide members 110. In addition, as illustrated in FIG. 8, the light-guide members 110 emit the light above the rod lens array 112 (in the direction of arrow B in FIG. 8).

The rod lens array 112 guides (converges) the light that has been emitted from the light-guide members 110, radiated to one of the documents G, and reflected by the document G to (onto) the light receiving elements 126. The light receiving elements 126 receive the light that has been reflected by the document G and converts the light into an electrical signal.

—Comparison to Light Emitting Device 280 According to First Comparative Example—

Operation of the light emitting device 180 will now be described in comparison to a light emitting device 280 according to a first comparative example. First, the difference between the configuration of the light emitting device 280 and the configuration of the light emitting device 180 will be mainly described.

Figure 18A:
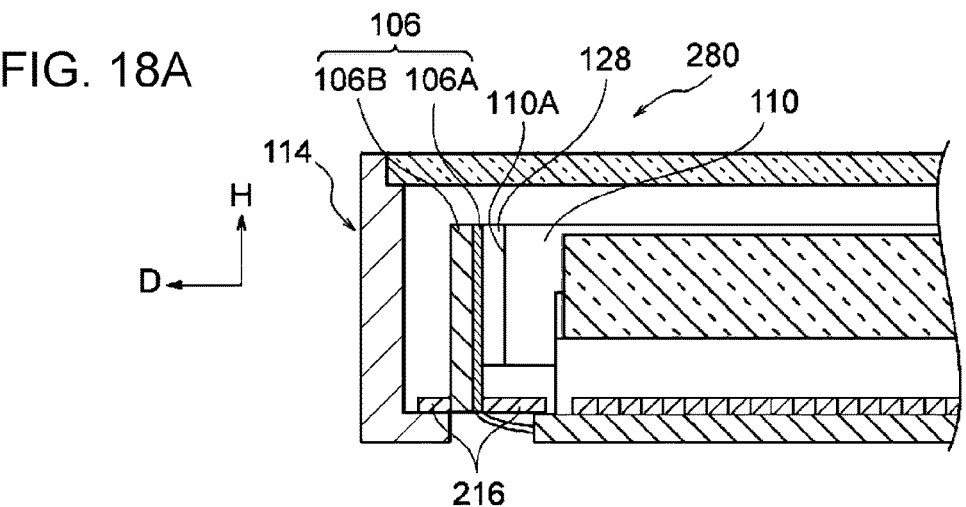
FIGS. 18A, 18B, and 18C are sectional views illustrating a light emitting device according to a first comparative example for the first exemplary embodiment of the present invention.

As illustrated in FIG. 18A, unlike the light emitting device 180, the light emitting device 280 does not include the pressing members 120. Support portions 216 are formed in the housing 114 of the light emitting device 280, and each of which the support portions 216 sandwiches the lower end portion of one of the rigid boards 106 in the apparatus depth direction. Accordingly, the lower end portions of the rigid boards 106 are positioned with respect to the housing 114 in the apparatus depth direction by the respective support portions 216.

In this configuration, when the temperature of a space in which the light emitting device 280 is disposed is 20° C., as illustrated in FIG. 18A, the light emitting elements 128 and the rigid boards 106 are not inclined with respect to the end surfaces 110A of the light-guide members 110, and the light emitting elements 128 are brought into contact with the end surfaces 110A of the light-guide members 110. In other words, the light emitting elements 128 are positioned as intended in the design with respect to the light-guide members 110.

Figure 18B:
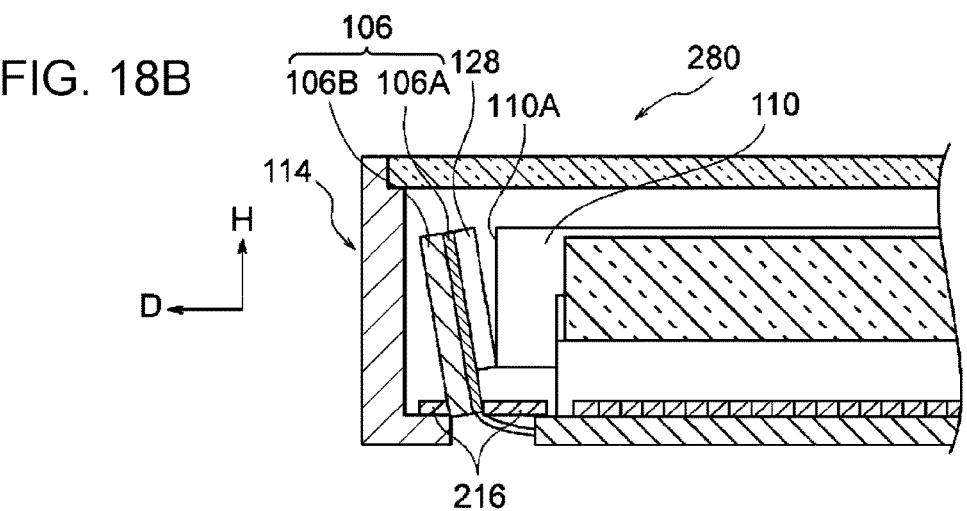

When the temperature of the space in which the light emitting device 280 becomes disposed is high (e.g., 30° C.), as illustrated in FIG. 18B, the light-guide members 110 expand in the apparatus depth direction. As a result, the light emitting elements 128 and the rigid boards 106 are pressed by the light-guide members 110 and are inclined with respect to the end surfaces 110A of the light-guide members 110. The light emitting elements 128 are inclined, so that the upper ends of the light emitting elements 128 are separated from the end surfaces 110A of the light-guide members 110.

Figure 18C:
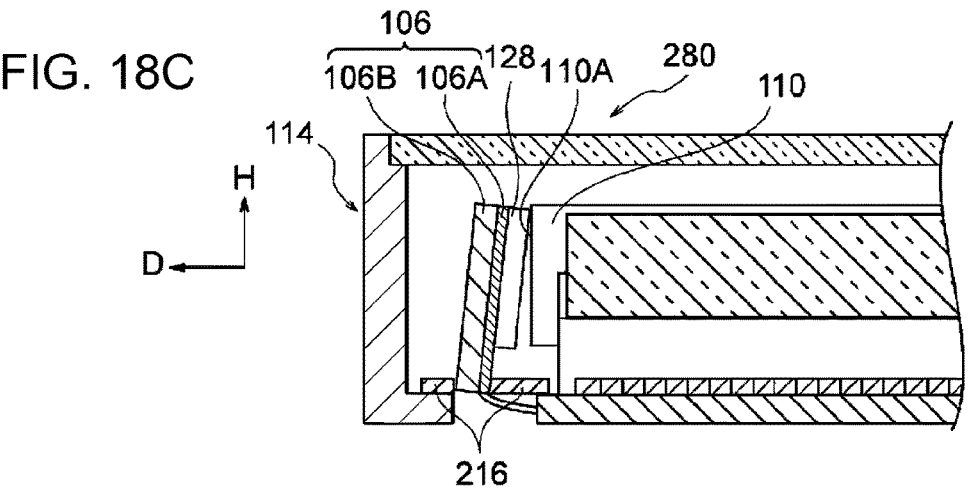

When the temperature of the space in which the light emitting device 280 becomes disposed is low (e.g., 10° C.), as illustrated in FIG. 18C, the light-guide members 110 contract in the apparatus depth direction. As a result, the light emitting elements 128 are separated from the end surfaces 110A of the light-guide members 110, and the light emitting elements 128 and the rigid boards 106 are inclined with respect to the end surfaces 110A of the light-guide members 110 due to the center of gravity of each of the light emitting elements 128 being off balance. The light emitting elements 128 are inclined, so that the lower ends of the light emitting elements 128 are separated from the end surfaces 110A of the light-guide members 110.

As described above, when the light-guide members 110 of the light emitting device 280 contract, the light emitting elements 128 are inclined with respect to the end surfaces 110A of the light-guide members 110. In other words, the optical axes of the light emitting elements 128 are inclined with respect to the axes of the light-guide members 110. Thus, some of the light radiated from the light emitting elements 128 does not enter the end surfaces 110A of the light-guide members 110. Consequently, the amount of light that is radiated onto one of the documents G becomes insufficient, and thus, in the image reading device 100, the reading accuracy with which an image of the document G is read deteriorates.

In contrast, in the light emitting device 180, as illustrated in FIG. 1 and FIG. 5, the cantilever members 132B and the T-shaped members 132A are deflected, so that the pressing members 120 press the light emitting elements 128 against the end surfaces 110A of the light-guide members 110 via the rigid boards 106. In addition, the rigid boards 106 are movable in the apparatus depth direction with respect to the housing 114.

—Comparison to Light Emitting Device 380 According to Second Comparative Example—

Operation of the light emitting device 180 will now be described in comparison to a light emitting device 380 according to a second comparative example. First, the difference between the configuration of the light emitting device 380 and the configuration of the light emitting device 180 will be mainly described.

As illustrated in FIG. 19, unlike the light emitting elements 128 of the light emitting device 180, light emitting elements 328 of the light emitting device 380 each do not include the support member 142 including the projecting plates 142B. A support member 342 of each of the light emitting elements 328 only includes a rectangular bottom plate 342A that is in contact with one of the rigid boards 106.

In this configuration, the pressing members 120 press the light emitting elements 328 against the end surfaces 110A of the light-guide members 110 via the rigid boards 106. As a result, the sealing members 150 of the light emitting elements 328 pressed by the pressing members 120 are brought into contact with the end surfaces 110A of the light-guide members 110. In addition, the sealing members 150 of the light emitting elements 328 are pressed against the end surfaces 110A of the light-guide members 110. Consequently, there is a possibility that breakage of the wires 154 will occur as a result of the sealing members 150 being deformed, so that a light emission failure of the light emitting chips 140 will occur.

In contrast, in the light emitting elements 128 of the light emitting device 180, as illustrated in FIG. 6, each of the support members 142 of the light emitting elements 128 includes the projecting plates 142B, so that the ends of the projecting plates 142B of the light emitting elements 128, which are pressed by the pressing members 120, are brought into contact with the end surfaces 110A of the light-guide members 110. In addition, the projecting plates 142B of the light emitting elements 128 are pressed against the end surfaces 110A of the light-guide members 110. As a result, the gaps 164 are formed between the sealing members 150 and the respective end surfaces 110A of the light-guide members 110.

In a state where the pressing members 120 are accommodated in the housing 114, the bottom surfaces 130A of the top plates 130 of the pressing members 120 have been brought into contact with the end portions of the light-guide members 110 from above. As a result, the light-guide members 110 are positioned with respect to the housing 114 in the top-bottom direction by the bottom surfaces 130A of the top plates 130. In addition, in the light emitting device 180, the number of components is smaller than that in the case where a positioning member that positions the light-guide members 110 with respect to the housing 114 is provided in addition to the pressing members 120.

In the light emitting device 180, the spaces 166 (see FIG. 7) that enable communication between the gaps 164, which are formed between the sealing members 150 and the respective end surfaces 110A of the light-guide members 110, and the outside of the light emitting elements 128 are formed. Therefore, air that is heated as a result of the light emitting chips 140 emitting light is discharged from the gaps 164 to the outside of the light emitting elements 128 through the spaces 166.

Second Exemplary Embodiment

Figure 20:
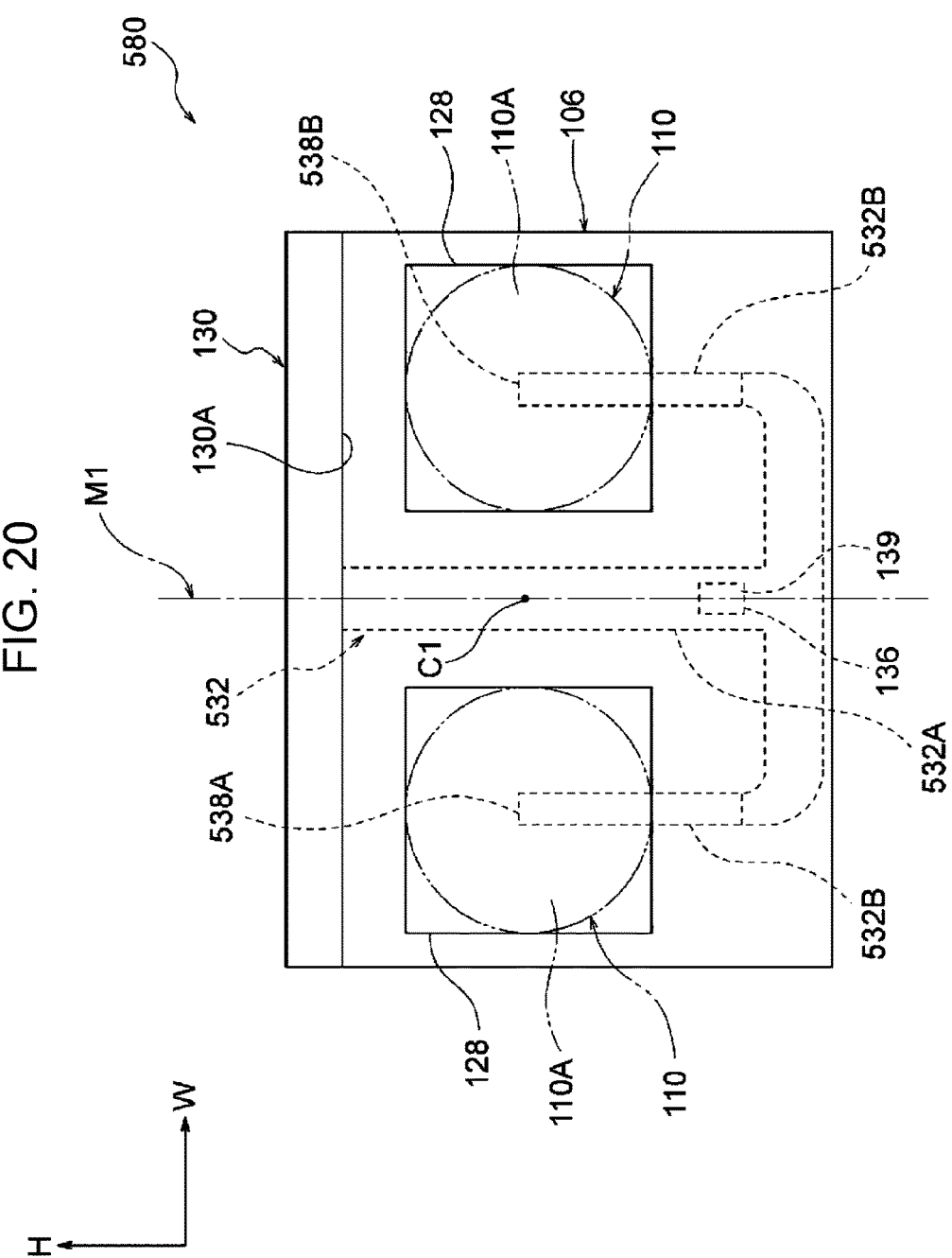
FIG. 20 is a front view illustrating a light emitting device and other components according to a second exemplary embodiment of the present invention.

An example of a light emitting device, an image reading device, and an image forming apparatus according to the second exemplary embodiment of the present invention will be described with reference to FIG. 20. Note that the difference between the second exemplary embodiment and the first exemplary embodiment will be mainly described.

Pressing members 520 of a light emitting device 580 according to the second exemplary embodiment each include the top plate 130 whose plate-thickness direction is parallel to the top-bottom direction and a body 532 that is fixed to the bottom surface 130A of the top plate 130 and that is positioned between one of the rigid boards 106 and one of the wall portions 119 of the housing 114 (see FIG. 1).

Each of the bodies 532 includes a T-shaped member 532A and a pair of cantilever members 532B. The T-shaped member 532A has an upper end portion that is fixed to the bottom surface 130A of the corresponding top plate 130 and that extends downward and a lower end portion that has a T shape extending in the apparatus width direction. The pair of cantilever members 532B are fixed to portions of the lower end portion of the T-shaped member 532A, the portions extending in the apparatus width direction.

Each of the pairs of cantilever members 532B extend in the top-bottom direction and are arranged in the apparatus width direction. The lower end portions of the cantilever members 532B are fixed ends, and the upper end portions of the cantilever members 532B are free ends. The upper end portions of the pair of cantilever members 532B form contact portions 538A and 538B by being in contact with one of the rigid boards 106. When viewed in the apparatus depth direction, the contact portion 538A is located in an area enclosed by the edge of one of the end surfaces 110A of one of the light-guide members 110, and when viewed in the apparatus depth direction, the contact portion 538B is located in an area enclosed by the edge of one of the end surfaces 110A of the other of the light-guide members 110.

The upper end portions of the pair of cantilever members 532B project toward the corresponding rigid board 106 (see FIG. 1), whereas the T-shaped member 532A does not project toward the rigid board 106, and the pair of cantilever members 132B are capable of being elastically deformed in the direction in which the cantilever members 532B project. In addition, the protrusion 136 is formed on a lower portion of the T-shaped member 532A, and the protrusion 136 protrudes toward the rigid board 106.

In this configuration, the upper end portions of the pair of cantilever members 532B are in contact with the rigid board 106, and the pair of cantilever members 532B are deflected (elastically deformed). In addition, the end of the protrusion 136 is in contact with the rigid board 106, and the T-shaped member 532A is deflected (elastically deformed). As a result of the cantilever members 532B and the T-shaped member 532A being deflected in this manner, the pressing member 520 presses the light emitting elements 128 against the end surfaces 110A of the light-guide members 110 via the rigid board 106.

The other operations in the second embodiment are similar to those in the first embodiment.

Note that although specific exemplary embodiments of the present invention have been described in detail, the present invention is not limited to the exemplary embodiments, and it is obvious to those skilled in the art that the present invention may employ other various exemplary embodiments within the scope of the present invention. For example, in the above-described exemplary embodiments, although each of the rigid boards 106 includes the body portion 106A that is a so-called flexible printed circuit and the heat sink 106B that is formed of an aluminum plate having a thickness of 1 mm, each of the rigid boards 106 may be a board such as a glass epoxy board or a metal board that fulfills the definition of the rigid board described above.

In the above-described exemplary embodiments, although each of the pressing members 120 and 520 is in contact with the corresponding rigid board 106 at three portions, each of the pressing members may be in contact with the rigid board 106 at two portions or less as long as the pressing members press the light emitting elements 128 against the end surfaces 110A of the light-guide members 110 via the rigid boards 106. However, in this case, the effects obtained by bringing each of the pressing members into contact with the corresponding rigid board 106 at three portions will not be obtained.

Figure 21:
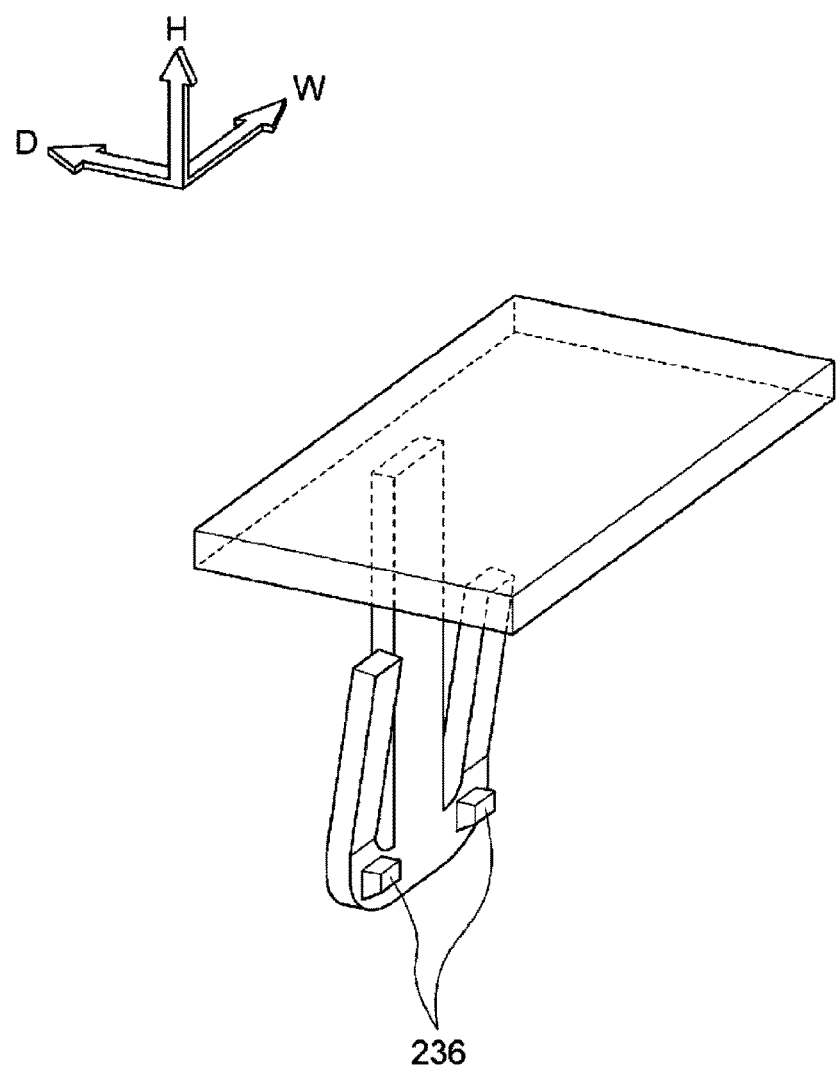
FIG. 21 is a perspective view illustrating a modification of the light emitting device according to the first exemplary embodiment of the present invention.

In the above-described exemplary embodiments, although each of the pressing members 120 and 520 is in contact with the corresponding rigid board 106 at three portions, as illustrated in FIG. 21, two protrusions 236 may be formed on each of the T-shaped bodies, and each of the pressing members may be in contact with the corresponding rigid board 106 at three or more portions.

In the above-described exemplary embodiments, although the light emitting elements 128 are disposed on opposite sides of the light-guide members 110 in the longitudinal direction of the light-guide members 110, the light emitting elements 128 may be disposed only on one side of the light-guide members 110.

In the above-described exemplary embodiments, although the image reading device 100 in which the light receiving board 102 and the rigid boards 106 are connected by the wiring cables 104 has been described, the image reading device 100 may have a configuration in which the body portion 106A of each of the rigid boards 106 may have a function of serving as a wiring cable and in which the light receiving board 102 and each of the body portions 106A may be directly connected to each other.

In the above-described exemplary embodiments, although the projecting plates 142B project from the respective sides of the bottom plates 142A toward the end surfaces 110A of the light-guide members 110, for example, the projecting plates 142B may project from portions of the bottom plates 142A, each of the portions being located near the center of the bottom plate 142A, toward the end surfaces 110A of the light-guide members 110. Gaps may at least be formed between the sealing members 150 and the respective end surfaces 110A of the light-guide members 110.

In the above-described exemplary embodiments, although the spaces 166 through which heat generated as a result of the light emitting chips 140 emitting light is discharged are formed, the spaces 166 may be formed by cutting out the projecting plates 142B, or the spaces 166 are not necessarily formed. In the case where the spaces 166 are not formed, the effects obtained by forming the spaces 166 will not be obtained.

In the image forming apparatus according to the above-described exemplary embodiments, although images are transferred onto the intermediate transfer belt from the photoconductor drums, each of which corresponds to one of the four colors, for example, the image forming apparatus may be configured such that an image is directly transferred onto one of the sheet members P from one of the image carriers 36 for a single color or the image carriers 36 for plural colors.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light emitting device comprising:
    at least one light-guide member that extends in one direction and that is fixed to a housing in such a manner as to be capable of expanding and contracting in the one direction;
    at least one light emitting element that is disposed in such a manner as to face an end surface of the light-guide member and that radiates light onto the end surface of the light-guide member;
    a rigid board that is disposed such that the light emitting element is interposed between the rigid board and the light-guide member and on which the light emitting element is mounted, the rigid board being movable in the one direction with respect to the housing; and
    a pressing member that presses the light emitting element against the end surface of the light-guide member via the rigid board.

2. The light emitting device according to claim 1,
    wherein a pair of the light-guide members are provided and arranged in a crossing direction that crosses the one direction,
    wherein a pair of the light emitting elements that radiate light onto the end surfaces of the pair of light-guide members are mounted on the rigid board, and
    wherein the pressing member is in contact with the rigid board at three or more portions and presses the light emitting elements against the end surfaces of the light-guide members via the rigid board.

3. The light emitting device according to claim 2,
    wherein, when a plane that extends through an intermediate point between the pair of light-guide members in the crossing direction and that is oriented in the crossing direction is a reference plane, a first contact portion where the pressing member is in contact with the rigid board and a second contact portion where the pressing member is in contact with the rigid board are located symmetrically to each other with respect to the reference plane.

4. The light emitting device according to claim 3,
    wherein, when viewed in the one direction, the first contact portion is located in an area enclosed by the edge of the end surface of one of the light-guide members, and
    wherein, when viewed in the one direction, the second contact portion is located in an area enclosed by the edge of the end surface of another one of the light-guide members.

5. The light emitting device according to claim 1,
    wherein the light emitting element includes
        a light emitting portion that radiates light,
        a sealing member that seals the light emitting portion, and
        a support member that is disposed such that the light emitting portion is interposed between the support member and the light-guide member and that supports the light emitting portion and the sealing member, wherein the support member includes a projecting portion that is formed in such a manner as to project toward the light-guide member, and wherein, in a state where the pressing member is pressing the light emitting element against the end surface of the light-guide member via the rigid board, an end of the projecting portion is in contact with the end surface of the light-guide member, and a gap is formed between the sealing member and the end surface of the light-guide member.

6. The light emitting device according to claim 5, wherein a space that enables communication between the gap and the outside of the light emitting element is formed.

7. An image reading device comprising:

the light emitting device according to claim 1;

a plurality of light receiving elements that are arranged in the one direction; and a guide member that extends in the one direction and that guides light emitted by the light emitting element and reflected by an object on which an image has been formed to the light receiving elements.

8. An image forming apparatus comprising:

the image reading device according to claim 7; and an image forming section that forms an image based on image information read by the image reading device.

\* \* \* \* \*